United States Patent
Misawa

(10) Patent No.: US 7,808,550 B2
(45) Date of Patent: Oct. 5, 2010

(54) DIGITAL CAMERA HAVING MECHANISM SHIFTABLE FOR PORTABILITY

(75) Inventor: Atsushi Misawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 1197 days.

(21) Appl. No.: 11/148,418

(22) Filed: Jun. 9, 2005

(65) Prior Publication Data
US 2005/0280732 A1 Dec. 22, 2005

(30) Foreign Application Priority Data
Jun. 9, 2004 (JP) .............................. 2004-171653

(51) Int. Cl.
*H04N 5/225* (2006.01)
(52) U.S. Cl. .................... 348/373; 348/375; 348/376; 348/333.01; 348/333.06; 348/333.13
(58) Field of Classification Search ............ 348/333.06, 348/333.13, 373, 375, 376
See application file for complete search history.

(56) References Cited

U.S. PATENT DOCUMENTS

| | | | | |
|---|---|---|---|---|
| 3,792,921 A | * | 2/1974 | Zwerger | 352/243 |
| 4,493,542 A | | 1/1985 | Ohmura et al. | |
| 5,436,686 A | * | 7/1995 | Walsh | 396/535 |
| 5,796,854 A | * | 8/1998 | Markow | 381/385 |
| 5,903,706 A | * | 5/1999 | Wakabayashi et al. | 386/117 |
| 6,016,176 A | * | 1/2000 | Kim et al. | 349/84 |
| 6,459,857 B2 | * | 10/2002 | Kawamura et al. | 396/374 |
| 6,671,462 B2 | | 12/2003 | Misawa | |
| 7,184,086 B2 | * | 2/2007 | Tamura | 348/333.06 |
| 2002/0187818 A1 | * | 12/2002 | Kang | 455/575 |
| 2003/0215582 A1 | * | 11/2003 | Bermel | 428/1.31 |
| 2004/0052044 A1 | * | 3/2004 | Mochizuki et al. | 361/683 |
| 2004/0109076 A1 | * | 6/2004 | Yokota et al. | 348/335 |
| 2004/0116167 A1 | * | 6/2004 | Okuzako et al. | 455/575.3 |
| 2004/0145653 A1 | * | 7/2004 | Choi | 348/14.02 |
| 2004/0174452 A1 | * | 9/2004 | Kinemura et al. | 348/333.06 |
| 2006/0146514 A1 | * | 7/2006 | Douglas | 362/84 |

FOREIGN PATENT DOCUMENTS

| | | |
|---|---|---|
| JP | 07-143368 | 6/1995 |
| JP | 10-210334 A | 8/1998 |
| JP | 11-289482 | 10/1999 |
| JP | 11-331669 A | 11/1999 |
| JP | 2003-250074 | 9/2003 |
| JP | 2003-274250 | 9/2003 |
| JP | 2005-354305 | 12/2005 |

* cited by examiner

*Primary Examiner*—Sinh Tran
*Assistant Examiner*—Paul Berardesca
(74) *Attorney, Agent, or Firm*—Sughrue Mion, PLLC

(57) ABSTRACT

A digital still camera includes has a camera body. An imaging unit is secured to the camera body, and has an image pickup device incorporated therein. A rotational supporting mechanism supports the camera body on the imaging unit between a closed position and an open position. The camera body is disposed lower than the imaging unit. The camera body, when in the closed position, is inside an extending region defined by extending a shape of the imaging unit downwards, and when in the open position, is offset from the extending region of the imaging unit. In a preferred embodiment, a central axis of the rotational supporting mechanism extends vertically. The open position is located horizontally from the closed position.

54 Claims, 18 Drawing Sheets

DIGITAL CAMERA HAVING MECHANISM SHIFTABLE FOR PORTABILITY

CROSS-REFERENCE TO RELATED APPLICATIONS

This application is based upon and claims the benefit of priority from prior Japanese Patent Application No. 2004-171653, filed Jun. 9, 2004.

BACKGROUND OF THE INVENTION

1. Field of the Invention

The present invention relates to a digital camera having a mechanism shiftable for portability. More particularly, the present invention relates to a digital camera having a mechanism shiftable for portability, in which plural elements are collapsible.

2. Description Related to the Prior Art

A digital camera is widely used, and includes an image sensor of CCD or CMOS type for picking up a motion picture or still image. An example of digital still camera is disclosed in U.S. Pat. No. 6,671,462 (corresponding to JP-A 2003-075897). Recently popular types of the digital still camera have been provided with construction for zooming. For higher portability of a camera body, the digital still camera is constructed so that a lens barrel having a zoom lens is collapsed into the camera body when not used.

A display panel in the digital still camera is used to display an image for monitoring and also for playing back image data previously stored. Examples of the display panel are an organic ELD panel, liquid crystal display panel, inorganic ELD panel, or other structures of a light valve of a visible type. The organic ELD panel is characterized in use of organic EL (electroluminescence). Those examples are advantageous in having an enlarged size of frame, and a reduced thickness. Also, JP-A 10-210334 and JP-A 11-331669 disclose a camera in a collapsible structure adapted for portability when not used, and with suitability for stable handling in photographing.

However, both structures in JP-A 10-210334 and JP-A 11-331669 have shortcomings in that a grip unit to be grasped manually has a small thickness relative to the thickness of the camera body. There is no disclosure of raising the thickness of the entirety of the camera body in view of raising the suitability for gripping.

U.S. Pat. No. 4,493,542 (corresponding to JP-A 59-033437) discloses changing over a direction of a camera body according to its thickness. This discloses a camera for use with photo film. Nothing in the document discloses a digital camera.

SUMMARY OF THE INVENTION

In view of the foregoing problems, an object of the present invention is to provide a digital camera having a mechanism shiftable for portability, in which plural elements are collapsible in a simple construction.

In order to achieve the above and other objects and advantages of this invention, a digital camera includes an imaging unit, having an image pickup device. A camera body has a shutter release button for shutter release of the image pickup device. A rotational supporting mechanism keeps rotatable the imaging unit and the camera body arranged vertically from one another. The camera body is in a shape defined by extending a shape of the imaging unit in a direction along a central axis of the rotational supporting mechanism.

The shutter release button is disposed opposite to the imaging unit when the imaging unit stands aligned with the grip portion with respect to the direction along the central axis.

Furthermore, a display unit is secured to at least the imaging unit, having a display surface directed backwards as viewed from the imaging unit, for displaying an image.

Furthermore, a camera body has the grip portion disposed outside. A circuit board is incorporated in the camera body, for controlling the imaging unit and the display unit, and for image processing of the image being picked up.

The rotational supporting mechanism supports the camera body on the imaging unit between a closed position and an open position, wherein the camera body, when in the closed position, is inside an extending region defined by extending a shape of the imaging unit in the direction along the central axis, and in the open position, is offset from the extending region of the imaging unit.

The camera body is disposed lower than the imaging unit, the central axis extends vertically, and the open position is located horizontally from the closed position.

The central axis extends along a vertically extending side of the imaging unit and the camera body, and a rotating amount of the camera body from the closed position to the open position is equal to or less than a half rotation.

The display unit has a smaller thickness than the imaging unit and the camera body.

The imaging unit further includes an electronic flash device for emitting flash light to a field to be photographed.

Furthermore, at least one signal line is disposed along the rotational supporting mechanism to extend between the camera body and the imaging unit, for electrically connecting the image pickup device and the flash device to the circuit board.

Furthermore, a photographing optical system focuses object light on the image pickup device. The photographing optical system includes a deflecting element for deflecting the object light having entered on a first path from an object side, to introduce the object light on a second path toward the image pickup device. The second path extends along and behind the flash device.

The display unit has flexibility, and is settable on and about the imaging unit and the camera body by bending in a direction along the central axis while the camera body is in the closed position.

The display unit includes a frame-shaped support, having an opening. The display panel is fitted in the opening. A protection film is fitted on one surface of the frame-shaped support, for protecting the display panel. A first connecting portion protrudes from an upper end of the frame-shaped support, for connection with the rotational supporting mechanism at an upper surface of the imaging unit. A second connecting portion protrudes from a lower end of the frame-shaped support, for connection with the rotational supporting mechanism at a lower surface of the camera body.

The display unit includes a first panel edge secured to the rotational supporting mechanism. A second panel edge is disposed opposite to the first panel edge, for extending in a direction along the first panel edge. A bending middle portion is disposed between the first and second panel edges, to extend in a direction along the first and second panel edges, and adapted to bending for a closed status. There are first and second panel regions, defined by splitting an area between the first and second panel edges with the middle portion, for being set over respectively first and second faces of the camera body when the camera body is in the closed position.

The display unit is set about the imaging unit and the camera body with the display surface directed inside.

Furthermore, a retention mechanism retains the display unit set about the camera body with the display surface directed inside.

In one preferred embodiment, the display unit is set about the imaging unit and the camera body with the display surface directed outside.

Furthermore, a retention mechanism retains the display unit set about the camera body with the display surface directed outside.

Furthermore, a standby image switch turns on while the display unit is set about with the display surface directed outside, to cause the display unit to display a standby image in a standby mode.

Furthermore, a rotation detector detects which of the closed position and the open position the camera body is in. The circuit board changes over an operating condition according to a detection signal of the rotation detector.

The rotation detector is positioned between the imaging unit and the camera body, or between the camera body and the display unit, to detect a relative rotation thereof.

Furthermore, an auxiliary rotation detector detects a relative rotation of the imaging unit relative to the display unit.

In another preferred embodiment, furthermore, a first switch is responsive to setting about of the display unit with the display surface directed inside, for turning off a camera power source. A second switch is responsive to setting about of the display unit with the display surface directed outside, for causing the display unit to display the image.

Furthermore, a retention projection is formed to project from the camera body and close to the rotational supporting mechanism. A retention slot is formed in a free edge of the display unit positioned opposite to the rotational supporting mechanism, for receiving the retention projection when the display unit is set about the camera body, to retain the free edge close to the rotational supporting mechanism.

In still another preferred embodiment, furthermore, a depressible power pushbutton is disposed on the camera body and close to the rotational supporting mechanism, for being depressed by the display unit when the display unit is bent on and about the camera body, to turn off a camera power source, and for being released from pressure when the display unit is spread from the camera body, to turn on the camera power source.

In another preferred embodiment, furthermore, a fixedly connecting portion inseparably connects the imaging unit with the display unit.

The display unit includes a flexible display panel for displaying an image when spread open. A resilient element is secured to the display panel in an overlaid manner, for keeping the display panel spread upon partial disengagement of the display panel from the camera body.

The display unit includes a sheet battery, secured to the display panel in an overlaid manner, for supply of camera power.

The display unit includes a transparent thin-film sound source, secured to the display surface on the display panel, for generating sound.

The display unit comprises any one of an organic electroluminescence element, inorganic electroluminescence element, and flexible film liquid crystal.

Furthermore, an interface transmits image data obtained by image pickup to an external electronic device.

Communication with the interface is according to at least one of USB, IEEE 1394, infrared communication, and wireless communication.

According to the invention, a digital camera including an image pickup device has a camera body. An imaging unit is secured to the camera body, and has the image pickup device incorporated therein. A rotational supporting mechanism supports the camera body on the imaging unit between a closed position and an open position, wherein the camera body, when in the closed position, is inside an extending region defined by extending a shape of the imaging unit in a predetermined direction, and when in the open position, is offset from the extending region of the imaging unit.

The predetermined direction is a downward direction, a central axis of the rotational supporting mechanism extends vertically, and the open position is located horizontally from the closed position.

Furthermore, a shutter release button is disposed on a face of the camera body opposed to the imaging unit, for being covered when the camera body is in the closed position, and for coming outside the imaging unit when the camera body is in the open position.

Furthermore, a circuit board is incorporated in the camera body, for controlling the imaging unit, and for image processing of the image being picked up.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
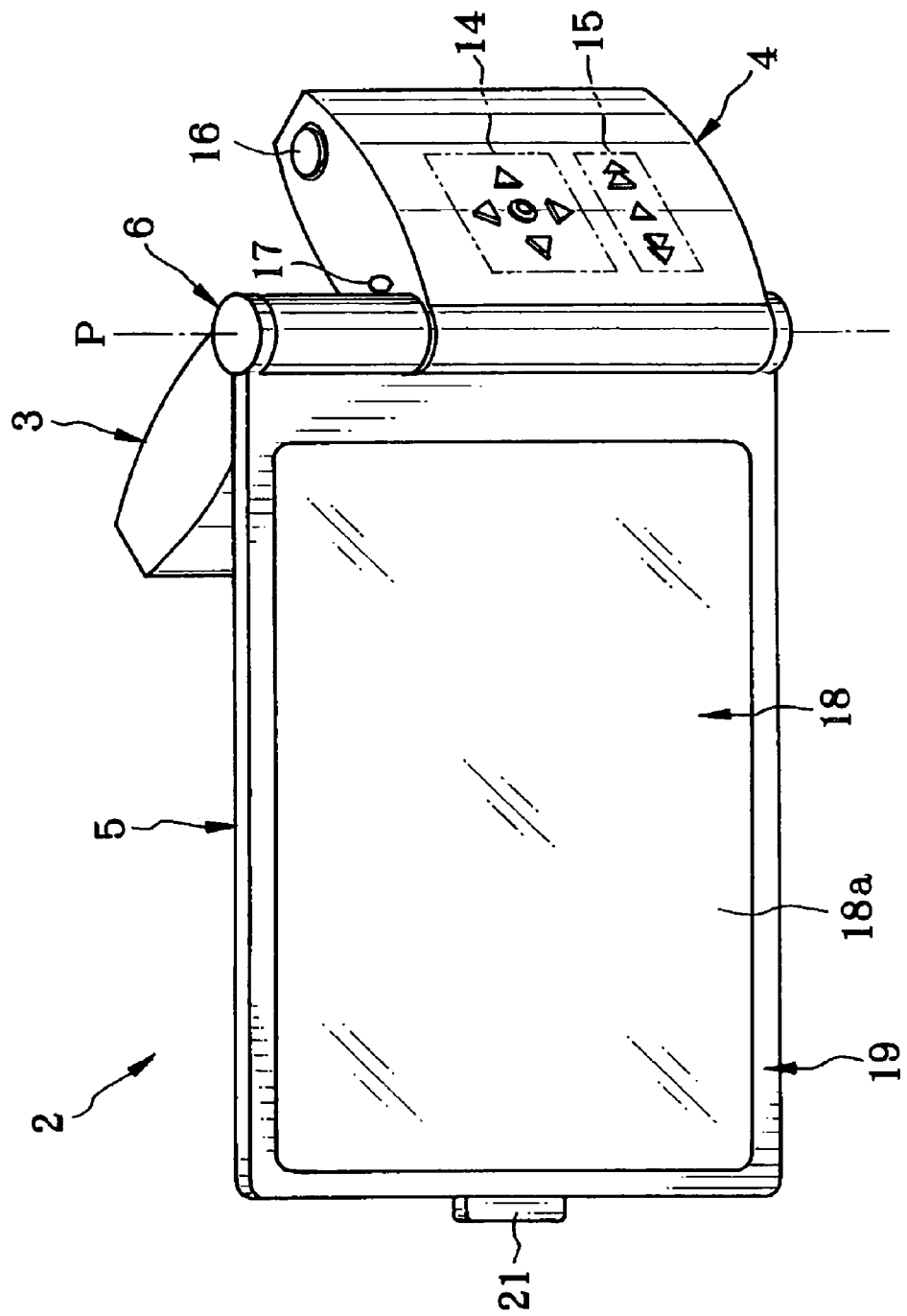
FIG. 1 is a perspective view illustrating a digital still camera.
Figure 2:
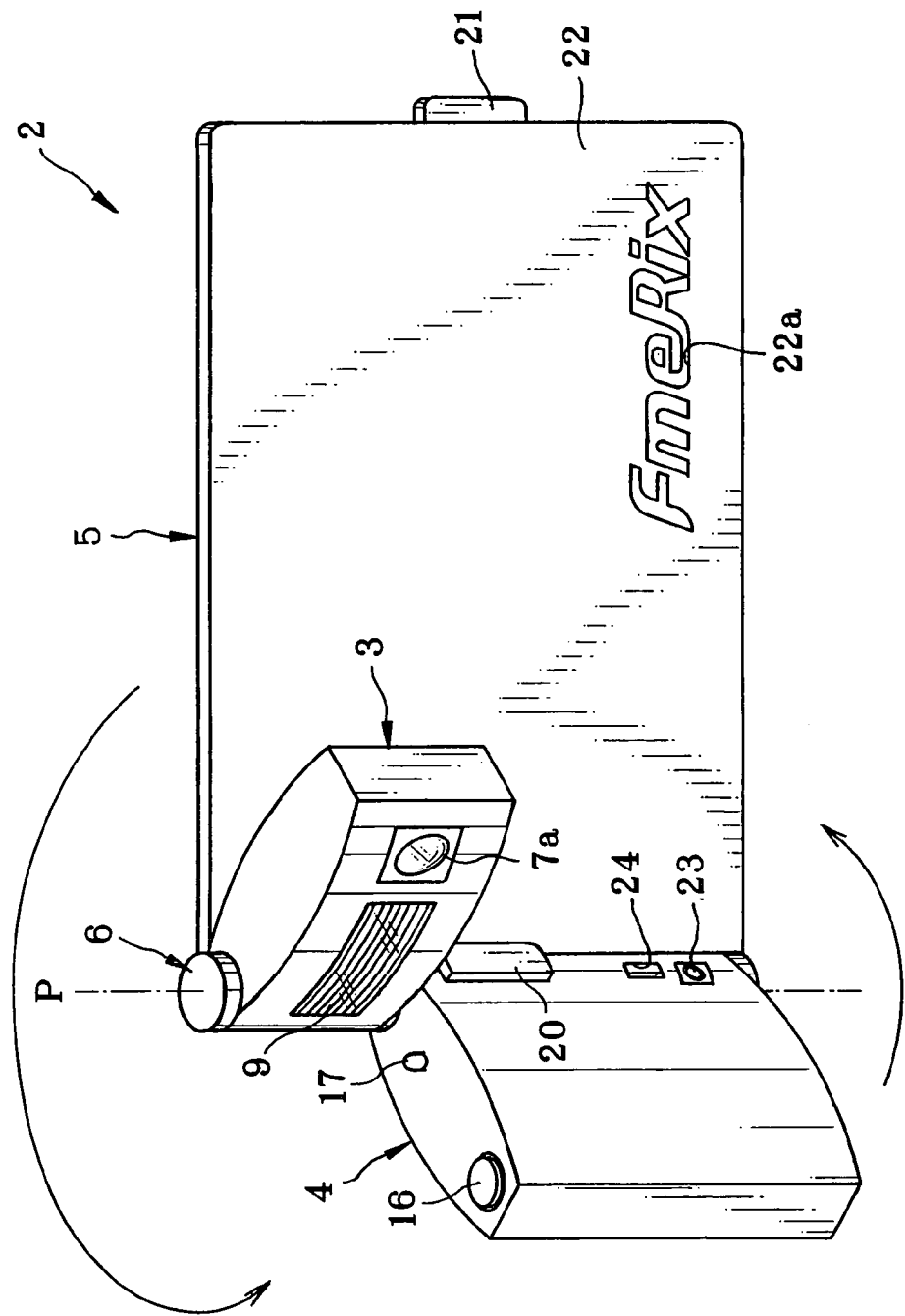
FIG. 2 is a perspective view illustrating a rear side of the digital still camera.

In FIGS. 1 and 2, a digital still camera 2 of the invention is illustrated. The digital still camera 2 includes an imaging unit 3, a camera body 4 having a grip portion, a flexible display unit 5 of a small thickness, and a rotational support mechanism 6. The imaging unit 3 contains a photographing optical system and an image pickup device. The camera body 4 contains a circuit board, battery and the like, and grasped by a user in the course of image pickup. The rotational support mechanism 6 extends along one side line of the display unit 5, and supports the imaging unit 3 and the camera body 4 in a rotatable manner. Each of the imaging unit 3 and the camera body 4 is in a shape of a rectangular parallelepiped on. The imaging unit 3 has substantially the same shape as viewed in a horizontal section as that of the camera body 4, and rotates coaxially with the camera body 4 about the central axis P.

Figure 3:
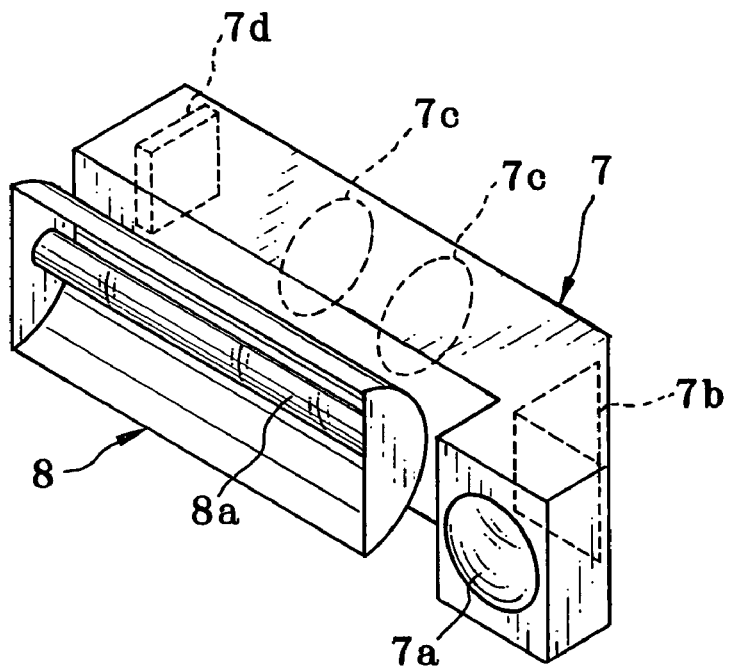
FIG. 3 is a perspective view illustrating an image pickup device and an electronic flash device.

The imaging unit 3 is kept rotatable on the display unit 5 by the rotational support mechanism 6 in connection with its lateral portion. A photographing optical system 7 and an electronic flash device 8 are incorporated in the imaging unit 3. See FIG. 3. An objective lens 7a of the photographing optical system 7 appears in the front of the imaging unit 3. A flash light source 9 of the flash device 8 is positioned at a window. In FIG. 3, the photographing optical system 7 is a refraction optical system, and includes a prism 7b, a zoom lens 7c and an image pickup device or solid state pickup element 7d. The prism 7b bends a path of the light passed through the objective lens 7a by an amount of approximately 90 degrees. A magnification of the zooming by use of the zoom lens 7c is for example 4 times. The flash device 8 is disposed horizontally and along a light path of the zoom lens 7c of the photographing optical system 7. A flash discharge tube 8a of the flash device 8 generates flash light by discharge. An example of the image pickup device 7d is a CCD (charge coupled device) image sensor or CMOS image sensor.

The display unit 5 is connected by the rotational support mechanism 6 to the camera body 4 having the grip portion along its vertical side in a rotatable manner. An input key pad 14 is disposed on a first large face of the camera body 4 on the user side, and includes direction keys operable for determining settings. A playback key pad 15 is also disposed on the first large face on the user side, and includes keys for starting and stopping the playback, changing over frames in a forward or backward direction, and the like. A shutter release button 16 and a rotation detecting switch 17 are disposed on an upper face of the camera body 4.

Figure 4:
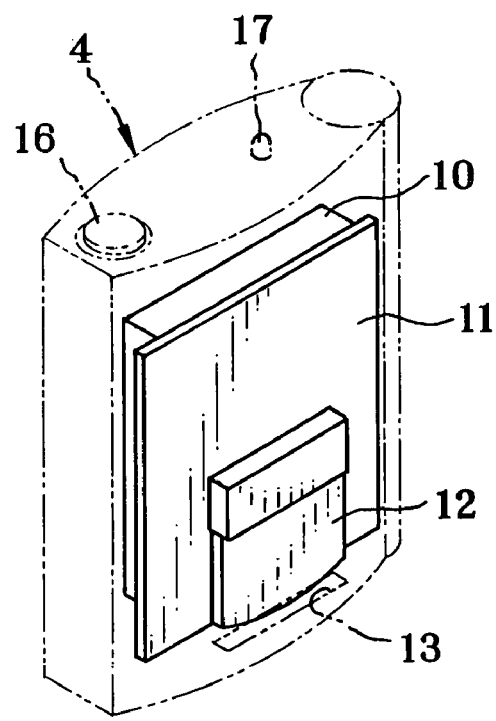
FIG. 4 is a perspective view illustrating a construction of a grip portion.

In FIG. 4, a battery 10 as camera power source is contained in the camera body 4 having the grip portion. A second large face of the camera body 4 on the object side is provided with a DC jack 23, a USB port 24 of an interface, and a fastening clamp 20. The DC jack 23 is a power source connector for being supplied with power by an electric outlet, or for connection with a plug to charge the battery 10 electrically. The USB port 24 constitutes an interface of communication for outputting image data to a personal computer or other electronic devices. The fastening clamp 20 retains the display unit 5 in a bent state when not used.

A circuit board 11 is disposed inside the camera body 4 having the grip portion, and has circuit elements including CPU. A memory card slot 13 is formed in the camera body 4 and open in its lower surface. A memory card 12 is inserted in the memory card slot 13 and connected with the circuit board 11. See FIG. 4. The circuit board 11 controls operation of the imaging unit 3 and the display unit 5 as will be described later in detail, and processes retrieved images. The camera body 4 has a shape and size suitable for being handled and grasped manually by a user. Also, a space inside the camera body 4 is utilized for effective accommodation.

The shutter release button 16 or a shutter switch is disposed at a distance from the rotational support mechanism 6. The shutter release button 16 is a two-step depressible type. When the shutter release button 16 is depressed halfway for a first step, then the circuits in the camera operate for auto-exposure (AE) and auto-focusing (AF) for the purpose of standby for image pickup. When the shutter release button 16 is depressed fully for a second step, a pickup signal of one frame ready for the exposure is converted to image data, so an image is picked up. Then the image data is subjected to image processing and compression, and then stored in the memory card 12.

The rotation detecting switch 17 is a pushbutton vertically depressible for turning on and off. When the imaging unit 3 is positioned directly on the camera body 4 having the grip portion, the rotation detecting switch 17 is turned on by pressure of the imaging unit 3. When the imaging unit 3 is offset from the camera body 4, the rotation detecting switch 17 is turned off by discontinuing the pressure thereto. A signal of the rotation detecting switch 17 for turning on and off is transmitted to the circuit board 11 contained in the camera body 4, and is used for detecting a rotational position of the imaging unit 3. Note that the position of the rotation detecting switch 17 may be determined differently, for example with the imaging unit 3 or the rotational support mechanism 6 instead of the camera body 4.

Figure 5:
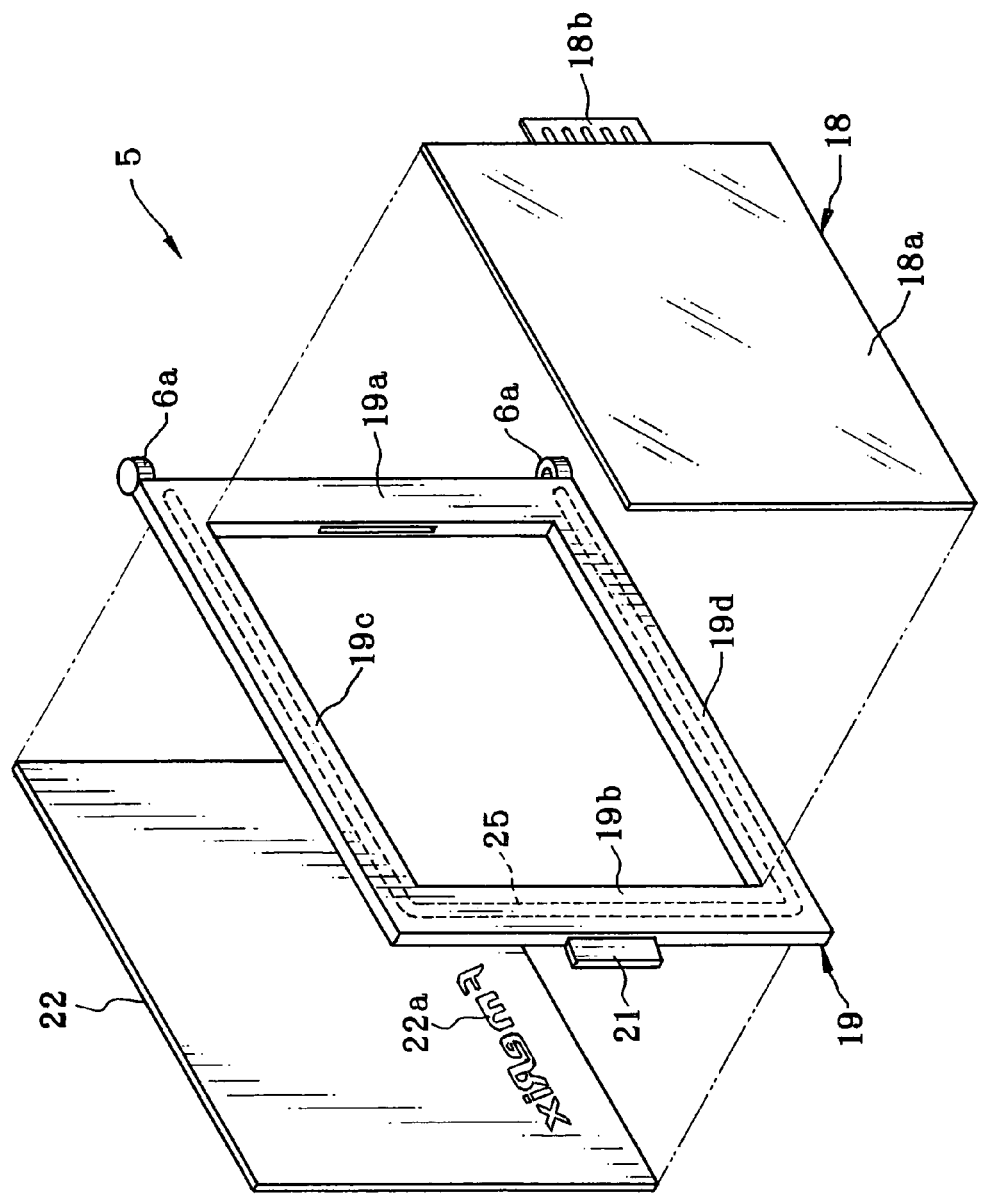
FIG. 5 is an exploded perspective illustrating a display unit.

In FIG. 5, the display unit 5 includes an organic ELD (electroluminescence display) panel 18, a bezel or frame-shaped support 19, and protection film 22. The organic ELD panel 18 is a flexible display panel, has a display surface 18a in a size of four inches, and has a smaller thickness than that of the imaging unit 3 and the camera body 4 having the grip portion. The organic ELD panel 18 includes a transparent plastic base plate, two electrode layers of an anode and cathode, and numerous organic EL elements. The base plate has flexibility. The two electrode layers of an anode and cathode are overlaid on the base plate. The organic EL elements are mounted between the two layers, and consist of organic molecules that are either monomer, oligomer or polymer. The flexible protection film 22 is opaque and blocks light. In the flexible protection film 22 is formed an optical transmission pattern 22a by cutting locally. The optical transmission pattern 22a has an alphanumerically patterned shape of FmeRix which is a product name of the camera.

A connection terminal 18b is an input for a voltage signal. When voltage is applied across the electrode layers through the connection terminal 18b, the organic EL elements responsively emit light, which is passed in a forward direction through a transparent plastic front panel. Each organic EL element is used as one pixel. The numerous organic EL elements are arranged in a matrix form, and selectively driven to display a full-color image. The organic ELD panel 18 is so flexible that, even when the organic ELD panel 18 is bent or curved, the display surface 18a of the organic ELD panel 18 can display an image. The connection terminal 18b is electrically connected with the circuit board 11 contained in the camera body 4.

The bezel 19 has a generally quadrilateral shape, and formed from such material as elastomer, and holds the organic ELD panel 18 by engagement with its periphery. A first panel edge 19a for connection of the bezel 19 is provided with a connection mechanism 6a, which is included in the rotational support mechanism 6 and connectable with the imaging unit 3 and the camera body 4 having the grip portion. Remaining three sides of the bezel 19 are a second panel edge 19b, an upper panel edge 19c and a lower panel edge 19d. A shape memory alloy wire 25 as resilient element is incorporated in those for flattening the display unit 5. When force is applied to the bezel 19, the bezel 19 and the organic ELD panel 18 are resiliently deformed. The bezel 19, when released from the force, becomes flat again. A retention ridge 21 protrudes from the second panel edge 19b of the bezel 19, and is retained by the fastening clamp 20 on the camera body 4.

Figure 6:
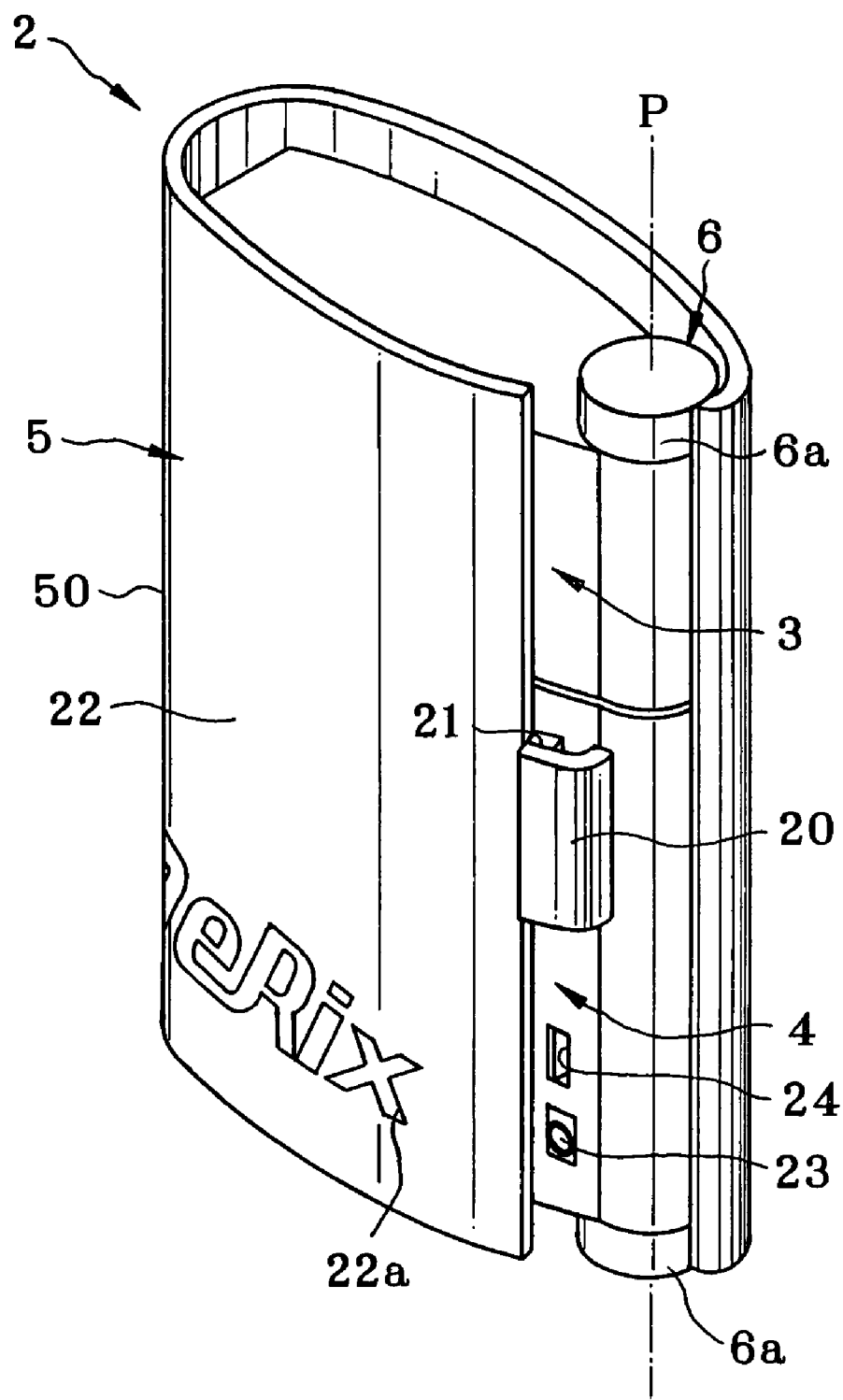
FIG. 6 is a perspective view illustrating a closed state of the digital still camera.

In FIG. 6, the closed state of the digital still camera 2 is depicted. The imaging unit 3 and the camera body 4 having the grip portion are rotationally aligned along the central axis P. The display unit 5 is bent by directing the display surface 18a inside, before the retention ridge 21 of the bezel 19 is fastened by retention of the fastening clamp 20 on the camera body 4. At this time, a middle portion 50 of bend splits the display unit 5 into a first portion in front of the imaging unit 3 and the camera body 4 and a second portion behind those. Thus, the display unit 5 is bent about to cover the outside of the imaging unit 3 and the camera body 4. The shutter release button 16 of the top of the camera body 4 is opposed to and protected by the downside of the imaging unit 3. The DC jack 23 and the USB port 24 are positioned always to appear externally irrespective of rolling of the display unit 5. Supply of the power and transmission of data are possible even while the display unit 5 is not used. The imaging unit 3 is in the closed position because aligned with the camera body 4.

Consequently, the shape of the digital still camera 2 can be changed to a compact shape with good portability even with the display unit 5 of a large size. The display unit 5 can be protected from external shock or the like by directing the display surface 18a inside. Also, the periphery of the imaging unit 3 is covered by the display unit 5, to protect the objective lens 7a without appearing externally. Note that light emitted by the organic EL elements is caused to pass through the optical transmission pattern 22a, to illuminate the letters of FmeRix readable in the optical transmission pattern 22a.

Figure 7:
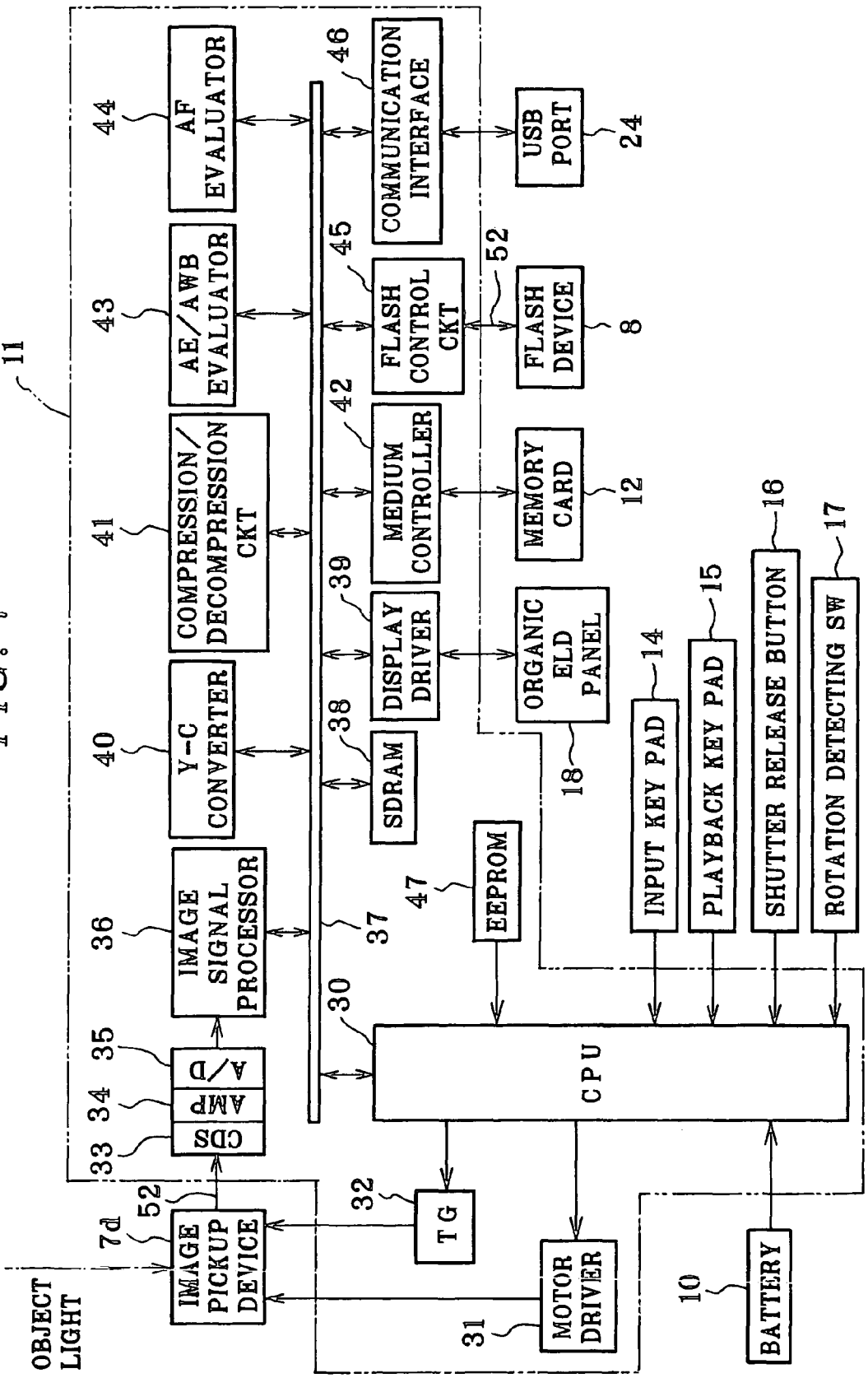
FIG. 7 is block diagram schematically illustrating circuitry of the digital still camera.

In FIG. 7, circuitry in the digital still camera 2 is illustrated. A lens motor (not shown) is incorporated in the photographing optical system 7, for driving the objective lens 7a. An iris motor (not shown) in the photographing optical system 7 drives the aperture stop mechanism. Each of the lens motor and the iris motor is a stepping motor. A motor driver 31 is connected with those motors. A CPU 30 causes the motor driver 31 to send drive pulses to the motors, to stand by the camera for an exposure in response to half depression of the shutter release button 16.

The lens motor causes the zoom lens 7c to move in one of directions toward the wide-angle end and telephoto end in response to the operatic so the input key pad 14. Also, the lens motor moves a focusing lens (not shown) according to zooming of the zoom lens 7c or an object distance, and adjusts the focal point to optimize the condition of exposure. The iris motor moves the aperture stop mechanism, to adjust an amount of exposure.

The image pickup device 7d of the photographing optical system 7 is also an electronic shutter. A timing generator (TG) 32 is connected with the image pickup device 7d, controlled by the CPU 30. A clock pulse or timing signal input by the timing generator 32 determines a shutter speed of the electronic shutter.

A correlated double sampling circuit (CDS) 33 is supplied with an image pickup signal output by the image pickup device 7d, and generates image data of the red, green and blue colors according to amounts of stored charge of cells in the image pickup device 7d. An amplifier (AMP) 34 amplifies image data output by the correlated double sampling circuit 33. An A/D converter 35 converts the amplified image data to digital image data.

An image signal processor 36 is supplied with the image data from the A/D converter 35, and subjects the same to image processing, for example gradation correction, white balance (WB) correction, gamma-correction and the like. A data bus 37 is connected with the image signal processor 36. An SDRAM 38 is connected with the data bus 37, through which the image data from the image signal processor 36 is stored in the SDRAM 38 in a temporary manner. A display driver 39 or display controller causes the organic ELD panel 18 to display a live image according to the image data.

A Y-C converter 40 reads image data from the SDRAM 38 in a processed form of image processing of various types by means of the image signal processor 36, and converts the processed image data into a brightness signal Y and color difference signals Cr and Cb. A compression/decompression circuit 41 compresses the converted image data according to a prescribed compressing format, for example JPEG (Joint Picture Expert Group) format. A medium controller 42 is supplied with a data file obtained by the compression, and writes the same to the memory card 12 set in the memory card slot 13.

An AE/AWB evaluator 43 detects and evaluates a condition of an exposure amount, namely shutter speed and aperture stop value according to suitability for the image pickup, and also detects suitability of white balance in view of optimum image pickup. An AF evaluator 44 evaluates a focused condition of the photographing optical system 7 in view of optimizing the image pickup. A flash control circuit 45 controls flash emission of the flash device 8. A communication interface 46 appears at the USB port 24 for communication with external equipment.

The AE/AWB and AF evaluators 43 and 44 transmit a result of detection to the CPU 30 via the data bus 37 upon half depression of the shutter release button 16. The CPU 30 is responsive to the detection results from the AE/AWB and AF evaluators 43 and 44, controls the motor driver 31 and the timing generator 32 according thereto, for adjusting an exposure amount of the photographing optical system 7.

There are signal lines 52 for connecting circuit elements including the image pickup device 7d and the flash device 8 to the circuit board 11. Specifically, the signal lines 52 are disposed to extend through the rotational support mechanism 6.

An EEPROM 47 is connected with the CPU 30 as well as the battery 10, the rotation detecting switch 17 and other input elements. The EEPROM 47 stores a control program and various sets of setting information. The CPU 30 reads the information from the EEPROM 47, writes the same to the SDRAM 38 as a work memory, and executes routines of various items.

The battery 10 supplies various elements with power through the CPU 30. The switches of the input key pad 14 and the playback key pad 15 generate an electric signal according to operation of command by a user, and sends the signals to the CPU 30. The switch of the shutter release button 16 generates an electric signal according to the half depression or full depression of the shutter release button 16 by the user, and sends the signal to the CPU 30. The rotation detecting switch 17 sends the CPU 30 a signal of being on or off according to a rotational position of the imaging unit 3 relative to the camera body 4 having the grip portion. The CPU 30 controls the relevant circuits according to the on or off signal, and changes over the digital still camera 2 by setting the playback mode or image pickup mode.

In the image pickup mode, a still image or motion picture is photographed, of which data is written to the memory card 12. In the playback mode, the still image data or motion picture data stored in the memory card 12 is read and played back on the organic ELD panel 18. Note that a microphone (not shown) may be incorporated in the camera, and used for recording sound while the motion picture is picked up. Data of the recorded sound can be written to the memory card 12 together with the motion picture data. Also, a speaker may be incorporated in the camera, and used for playing back sound while the motion picture is played back.

Among the various elements in the digital still camera 2, those surrounded by the phantom lines are positioned on the circuit board 11 by suitable techniques for producing circuit boards. Note that any suitable circuit elements may be added by modifying the circuit board 11 in consideration of the required purposes.

The operation of the digital still camera 2 is described now. For a user to photograph an object with the digital still camera 2, at first he or she spreads the display unit 5 by disengaging the retention ridge 21 from the fastening clamp 20 in the state of FIG. 6 to the state of FIG. 8. The imaging unit 3 is rotated to direct the objective lens 7a toward the object. Thus, the shutter release button 16 appears in the upper face of the camera body 4 having the grip portion. The rotation detecting switch 17 is turned off as the lower face of the imaging unit 3 does not press the rotation detecting switch 17. The digital still camera 2 is set in the image pickup mode upon receiving an off signal of the rotation detecting switch 17.

Figure 8:
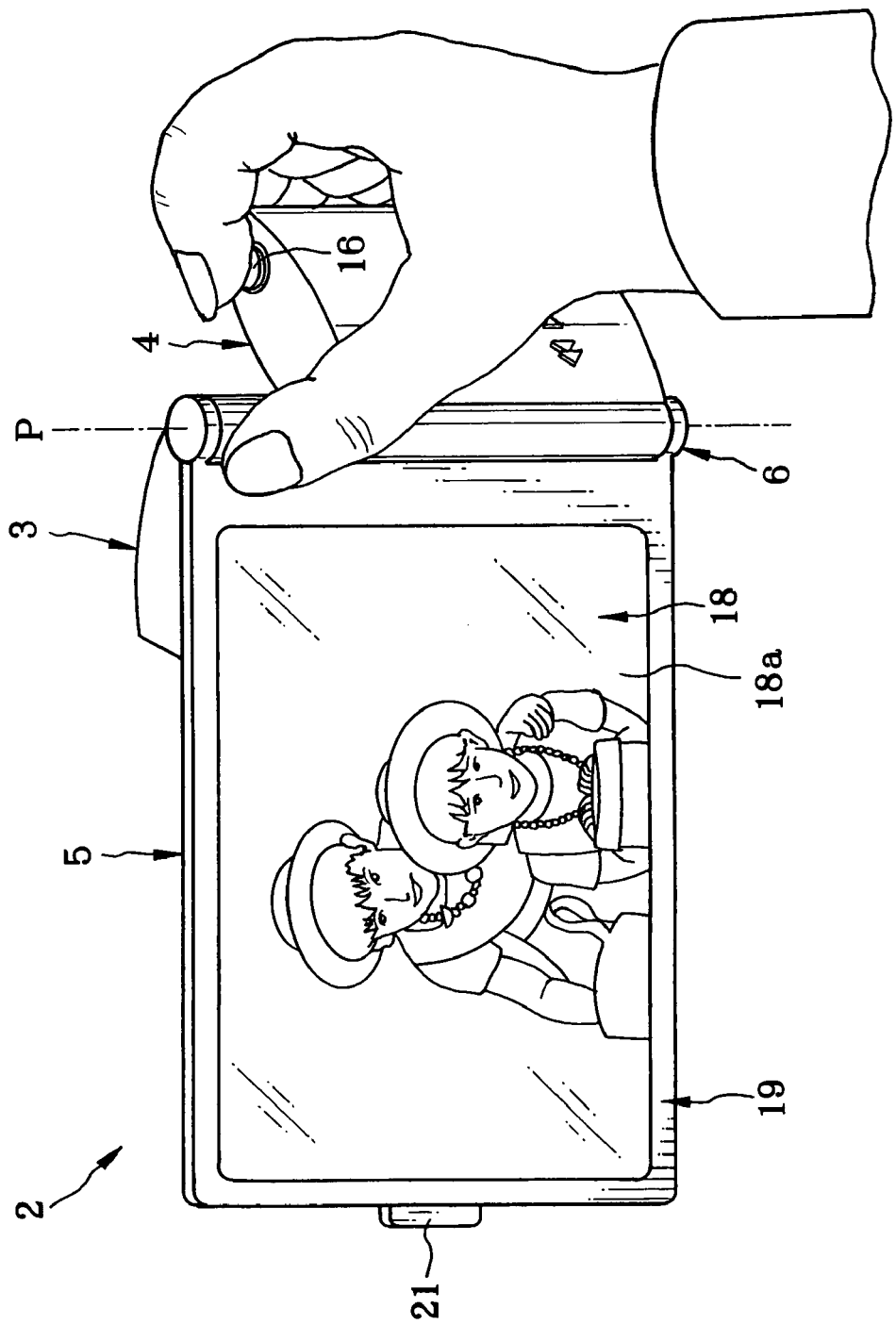
FIG. 8 is a perspective view illustrating a state of the digital camera in an image pickup mode.

The user selects one of the still image pickup mode and motion picture pickup mode by pushing the input key pad 14 of the camera body 4 having the grip portion. Object light incident through the objective lens 7a is converted to digital image data in any of those pickup modes. A live image is displayed on the organic ELD panel 18 according to the image data. In FIG. 8, a user grasps the camera body 4 with his or her right hand to target and frame an object. In the course of this, he or she depresses the shutter release button 16 with an index finger of the right hand. The user will not touch or block the objective lens 7a of the imaging unit 3 or the flash light source 9 owing to his or her orientation of the hand at the camera body 4. Note that it is possible to determine the positions of the imaging unit 3, the camera body 4 and the display unit 5 differently from those in the drawing. The positions are preferable if the camera body 4 is easy to grasp and the display unit 5 is easy to observe by their suitable rotational adjustment.

In the still image pickup mode, when the shutter release button 16 is depressed halfway, standby operation is made for an exposure. When the shutter release button 16 is fully depressed, image data of one frame stored in the SDRAM 38 is compressed, and written to the memory card 12.

The motion picture pickup mode is described. When the shutter release button 16 is depressed fully, the motion picture pickup is started. Image data are written to the memory card 12 at a constant frame rate, for example 30 frames per second until the shutter release button 16 is fully depressed again. If the camera has a microphone, voices and other ambient sounds are recorded during the motion picture pickup, and written to the memory card 12 in association with the image data.

Figure 9:
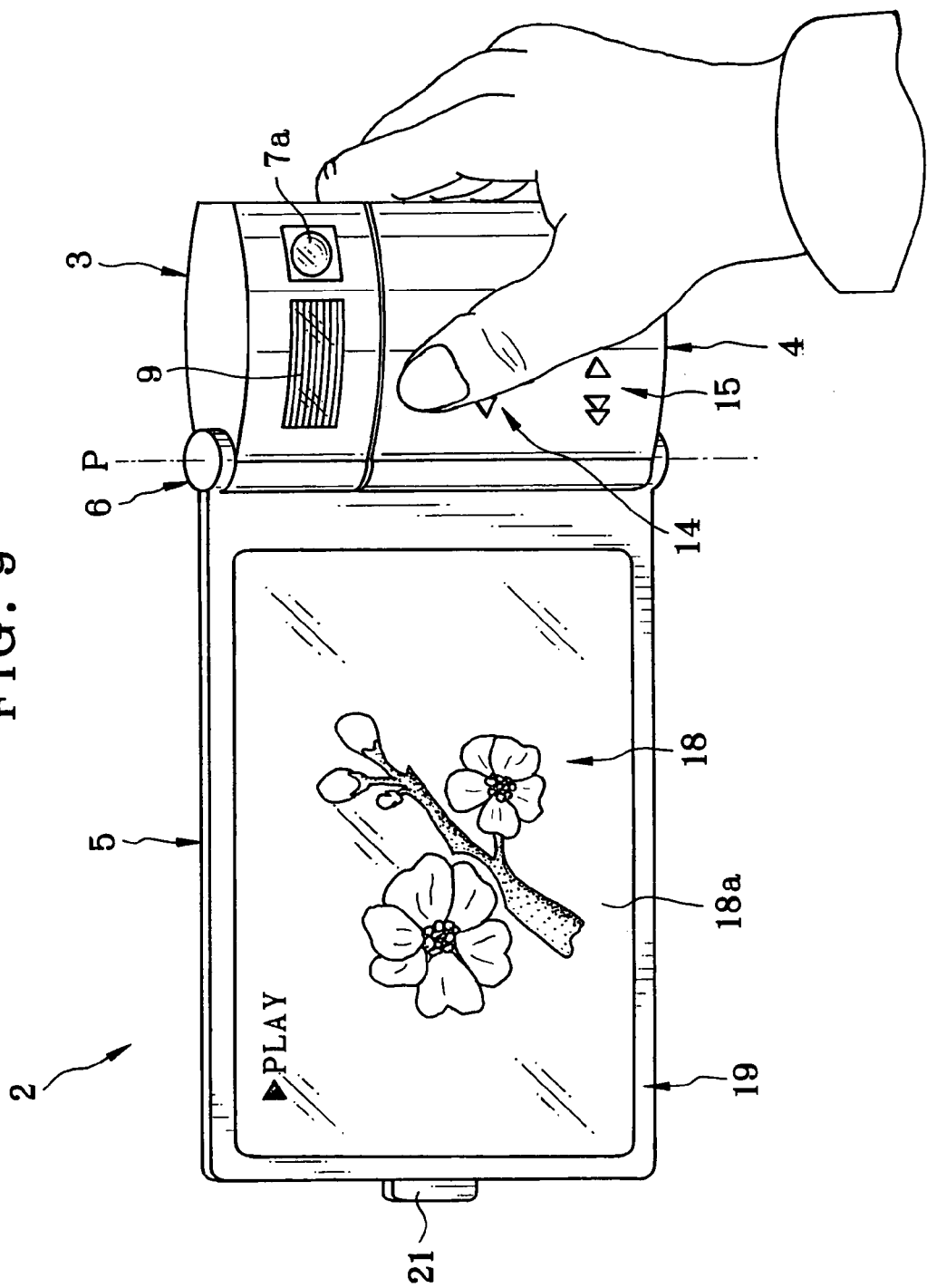
FIG. 9 is a perspective view illustrating a state of the digital camera in a playback mode.

After an image is photographed, the imaging unit 3 and the camera body 4 having the grip portion are rotationally shifted as illustrated in FIG. 9, to align the imaging unit 3 with the camera body 4 in the direction along the central axis P of the rotational support mechanism 6. At this time, the lower face of the imaging unit 3 is placed directly on the upper face of the camera body 4, to cover the shutter release button 16 on the camera body 4. The rotation detecting switch 17 is depressed down by the imaging unit 3 and turned on. The digital still camera 2 receives an on signal from the rotation detecting switch 17, and set in the playback mode. A user suitably operates the input key pad 14 and the playback key pad 15 to playback image data and sound data stored in the memory card 12, so he or she can enjoy seeing images and hearing sounds. Also, a data file of one movie can be stored in the memory card 12, and played back for the purpose of seeing the movie.

Note that the rotation detecting switch 17 can be constructed that the on signal of the rotation detecting switch 17 is made invalid in the state of FIG. 9 while the image pickup mode is set. It is possible to direct the objective lens 7a in the same direction as that of the organic ELD panel 18. It is possible for a user to produce his or her portrait.

Figure 10:
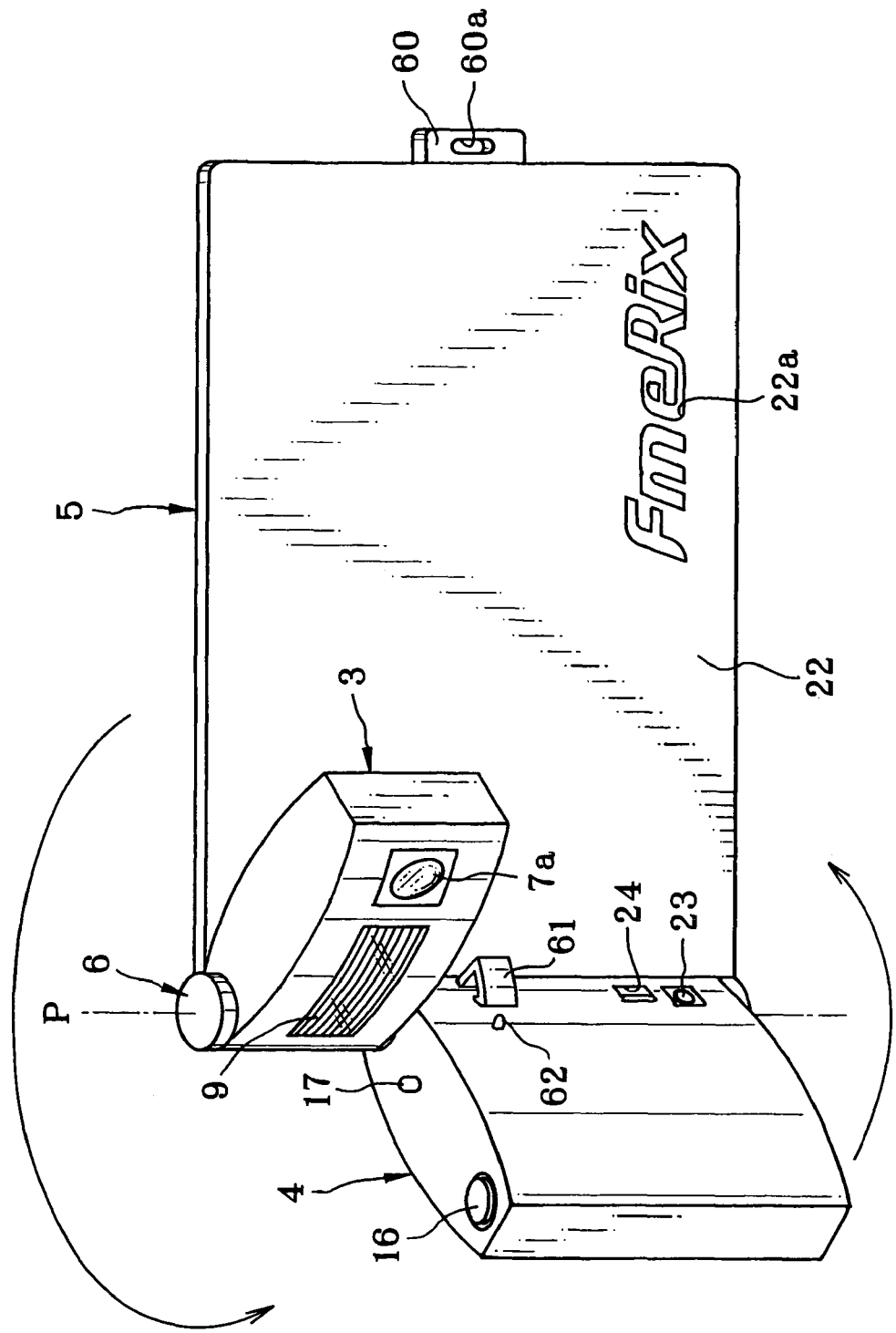
FIG. 10 is a perspective view illustrating another preferred digital still camera in which there are a retention projection and a power pushbutton.
Figure 11:
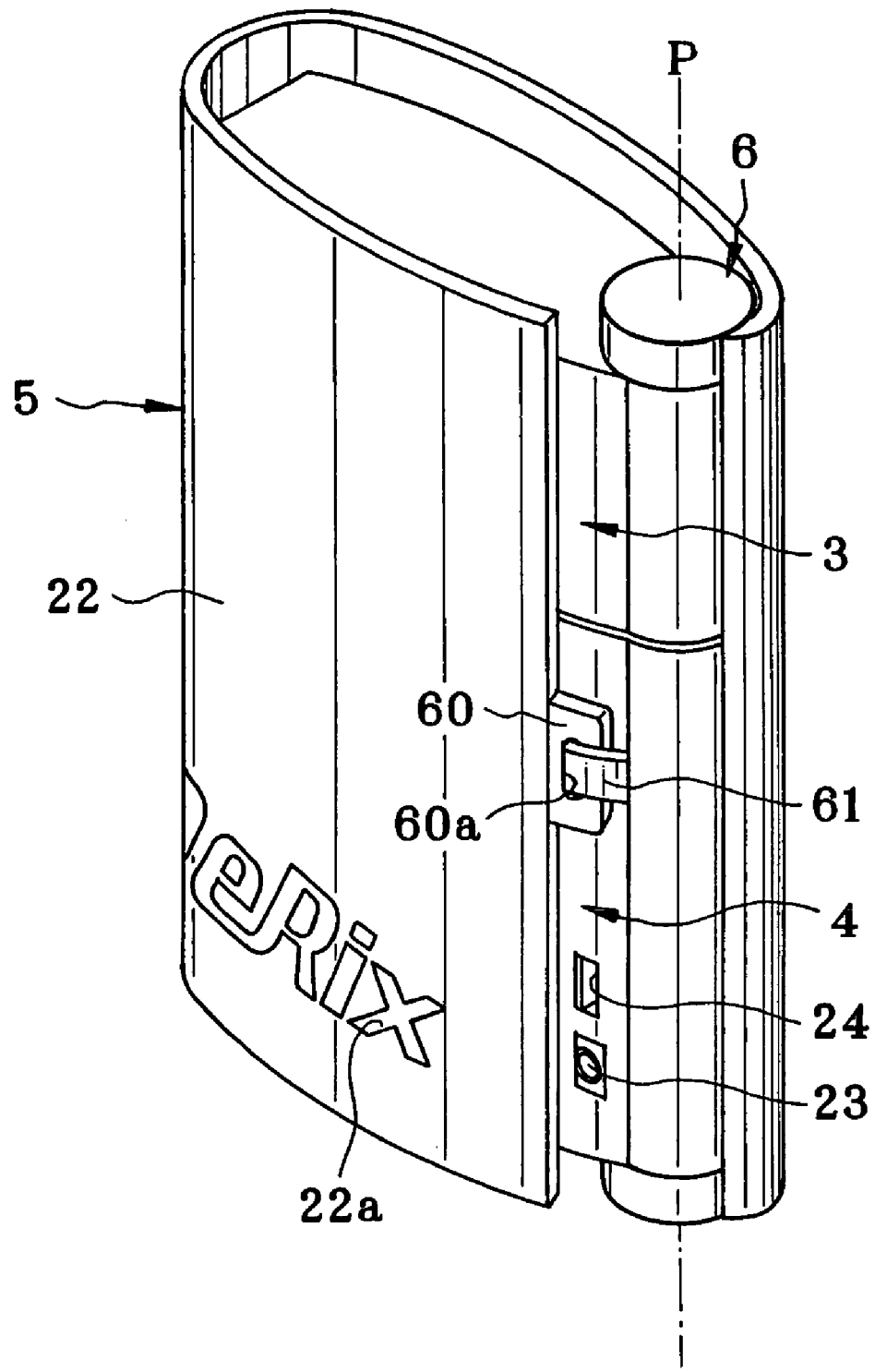
FIG. 11 is a perspective view illustrating a state of setting a display unit about with its display surface directed inside.

Furthermore, it is possible to use a different structure from the retention ridge 21 and the fastening clamp 20. In FIG. 10, there is a free end ridge 60 formed on the bezel 19. A retention slot 60a is formed in the free end ridge 60. The display unit 5 is fitted about the imaging unit 3 and the camera body 4 having the grip portion, before a retention claw or hook as retention projection 61 of the camera body 4 is engaged with and retained by the retention slot 60a. See FIG. 11. Note that it is possible to form the retention claw 61 on either of the imaging unit 3 and the rotational support mechanism 6.

In FIG. 10, an example of the camera body 4 having the grip portion has a power pushbutton 62 at a power switch disposed close to the retention claw 61. The power pushbutton 62, when depressed, turns off powering with the battery 10, and when released from depression, turns on the powering of the battery 10. When the digital still camera 2 is not used, the free end ridge 60 of the bezel 19 depresses the power pushbutton 62 to turn off the power supply. When the retention claw 61 is disengaged from the retention slot 60a for an effective state, the power pushbutton 62 is released from depression to turn on the power supply. This structure is advantageous in removing operation from a user for turning on and off the power supply of the digital still camera 2. The digital still camera 2 can be set up in the effective state when the user wishes to use the digital still camera 2. The power pushbutton 62 is a normal open switch in a pushbutton form.

Figure 12:
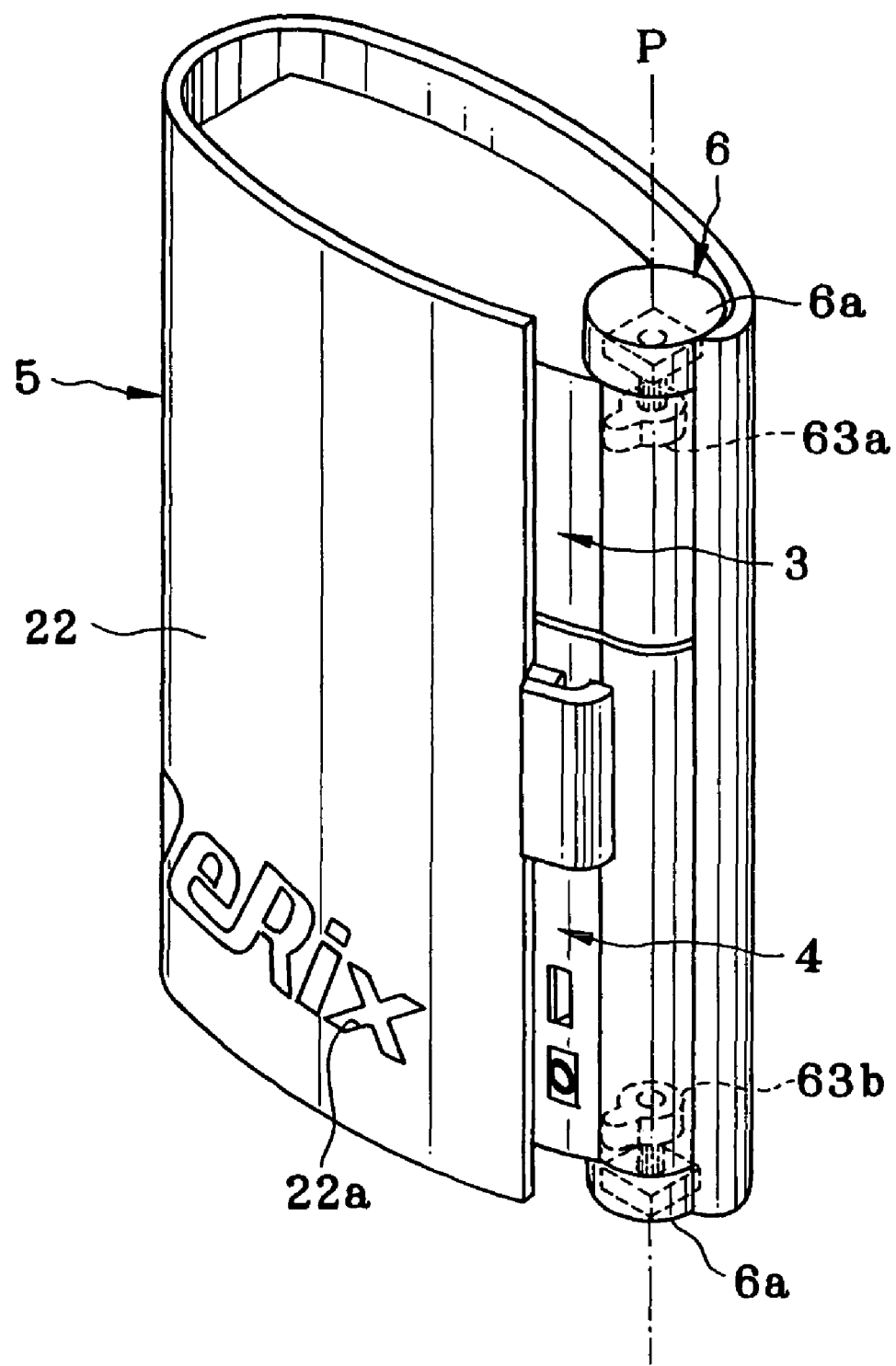
FIG. 12 is a perspective view illustrating a construction having first and second rotary switches.

In FIG. 12, an example without the rotation detecting switch 17 is illustrated. A first rotary switch 63a detects rotation of the imaging unit 3 relative to the display unit 5, as an auxiliary rotation detector. A second rotary switch 63b detects rotation of the display unit 5 relative to the camera body 4 having the grip portion. Information obtained from those can be used in the same manner as the output of the rotation detecting switch 17.

Also, changing over of the digital still camera 2 between the image pickup mode and the playback mode can be according to a rotational position between the imaging unit 3 and the display unit 5 or a rotational position between the camera body 4 having the grip portion and the display unit 5 upon detection of the rotational position. A condition of the digital still camera 2 in operation changeable according to the rotational position can be determined for any two suitable modes other the image pickup mode and the playback mode, for example a photographing state setting mode and the like.

Note that the second rotary switch 63b without combination of the first rotary switch 63a can be used simply. This is because an output of the second rotary switch 63b may be used with the same meaning as that of the rotation detecting switch 17 of the above embodiment.

Figure 13:
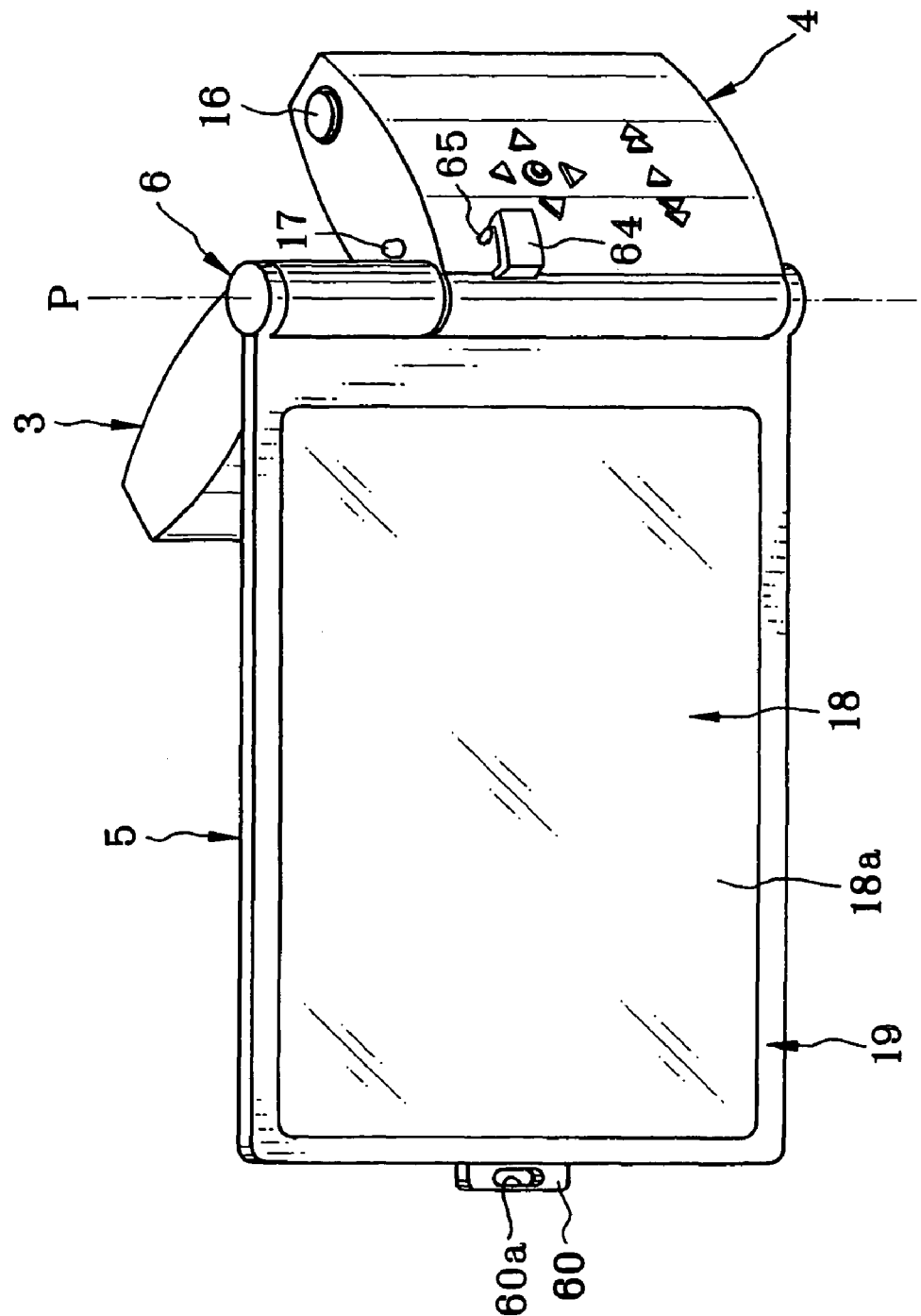
FIG. 13 is a perspective view illustrating a front side of the digital still camera.
Figure 14:
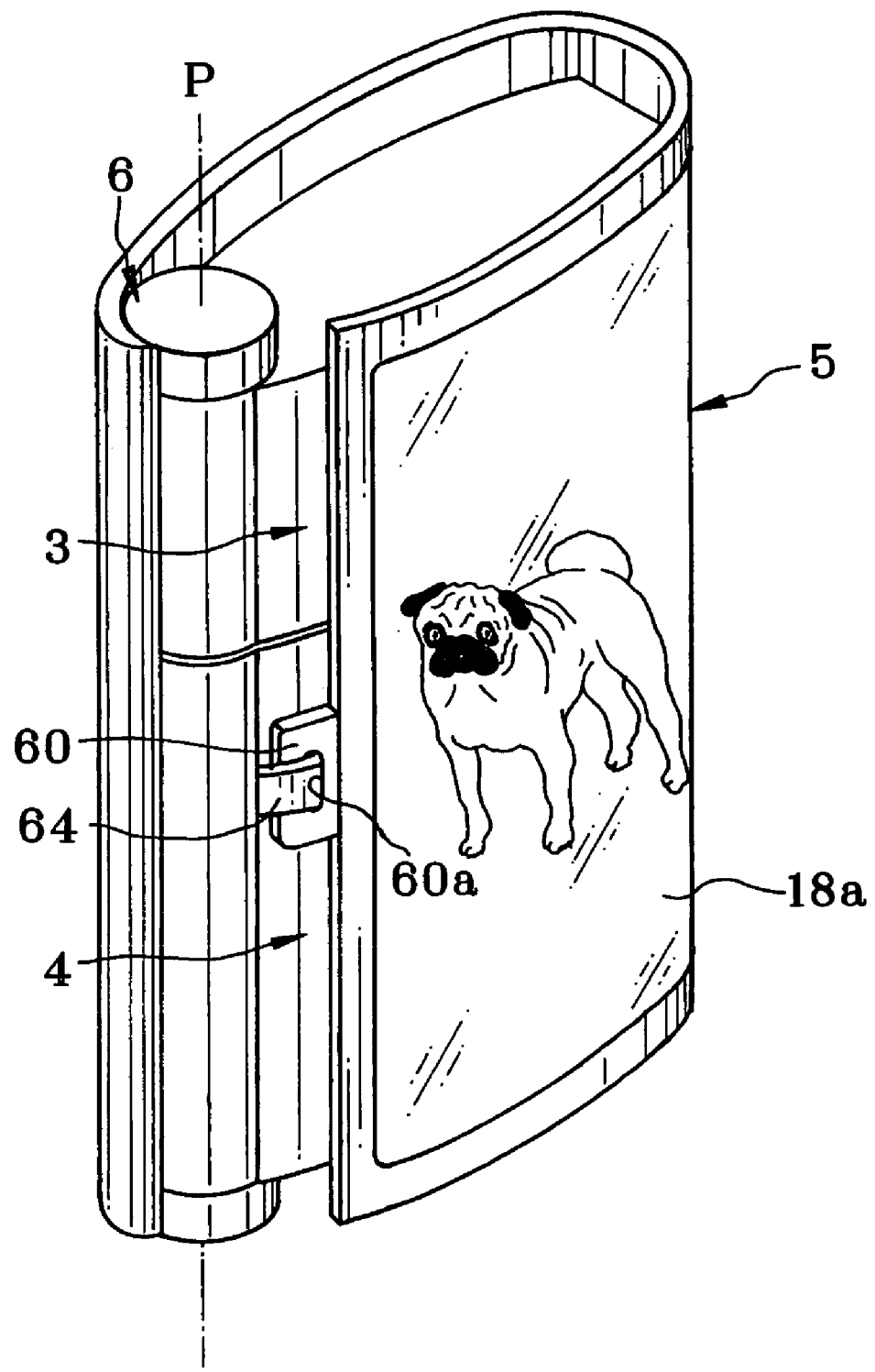
FIG. 14 is a perspective view illustrating a state of setting the display unit about with its display surface directed outside.

In spite of the outward orientation of the display surface 18a in setting the display unit 5 about the camera body 4 having the grip portion, the display unit 5 can be set externally to direct the display surface 18a outside. In FIG. 13, a retention claw or hook as retention projection 64 is formed to project from the first large face of the camera body 4 on the user side, and engageable with the retention slot 60a of the free end ridge 60. The retention claw 64 makes it possible as depicted in FIG. 14 to set the display unit 5 about the imaging unit 3 and the camera body 4 by directing the display surface 18a outside. The display unit 5 is set rollable both in the inward direction and in the outward direction. In the standby state of the display unit 5 set about, a standby image of a still image or motion picture can be displayed on the display surface 18a appearing outside. Appearance of the digital still camera 2 can be greatly modified. It is to be noted that the imaging unit 3 is in the closed position relative to the camera body 4 even in the standby state of the display unit 5. A setting of the playback mode is allowed, in contrast with a setting of the image pickup mode being disabled.

In FIG. 13, a structure with a standby image switch 65 is illustrated. The standby image switch 65 with a pushbutton is an additional switch disposed near to the retention claw 64 of the camera body 4 having the grip portion, and depressed to cause the display surface 18a to display a standby image. When the display unit 5 in the digital still camera 2 is bent to set the display surface 18a externally, the standby image switch 65 is depressed by the retention projection 60 of the bezel 19. The standby image is caused automatically to appear on the display surface 18a.

Figure 15:
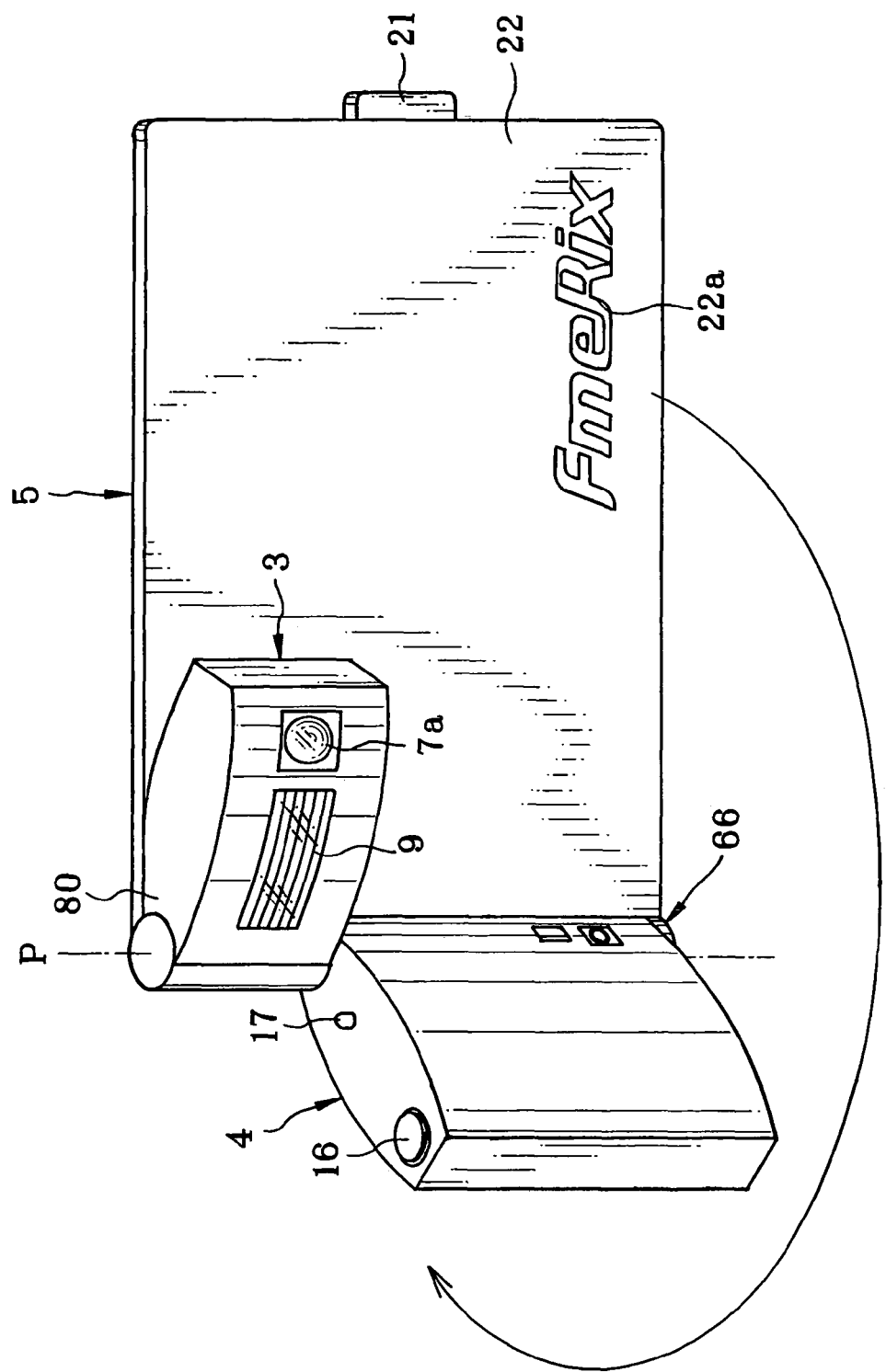
FIG. 15 is a perspective view illustrating one preferred digital still camera.
Figure 16:
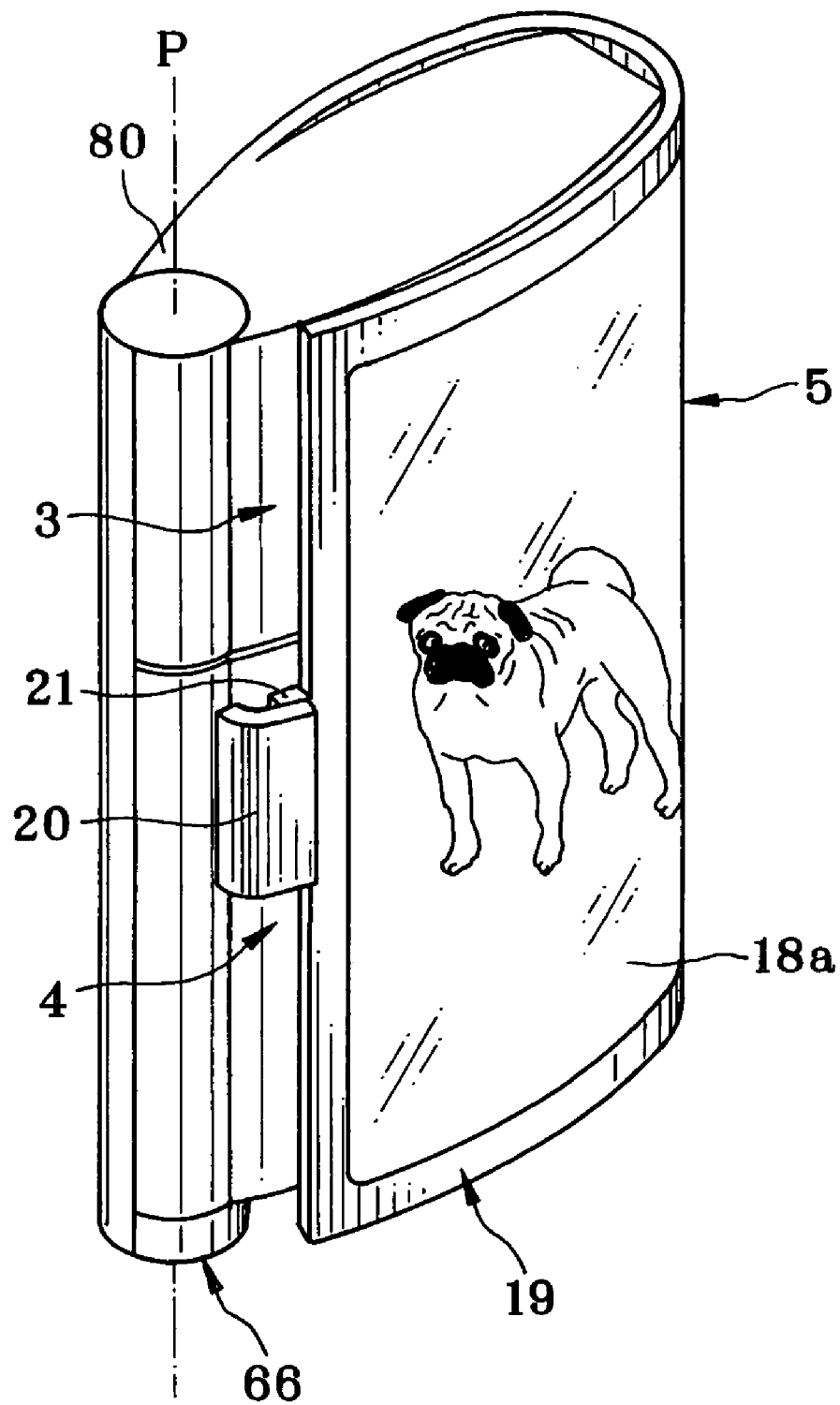
FIG. 16 is a perspective view illustrating a state of setting a display unit about with its display surface directed outside.

In FIG. 15, another preferred structure of the digital still camera 2 is depicted, in which the imaging unit 3 is inseparable from the display unit 5. A fixedly connecting portion 80 lies between the imaging unit 3 and the display unit 5 as intermediate portion for firm connection. A rotational support mechanism 66 or a hinge mechanism connects the display unit 5 to the camera body 4 having the grip portion and keeps the display unit 5 movable pivotally on the camera body 4. Various methods can be used for keeping the imaging unit 3 inseparable with the display unit 5. For example, adhesive agent is applied to the imaging unit 3 for attachment to the display unit 5. Screws may be used to fasten the imaging unit 3 to the display unit 5. Otherwise, the imaging unit 3 may be included in one piece having the display unit 5. To this end, elastomer resin or other resilient material can be used to form the piece having the display unit 5 and the imaging unit 3. In FIG. 16, a state of the display unit 5 directing the display surface 18a outwards about the imaging unit 3 and the camera body 4 is illustrated. A standby image is displayed on the display surface 18a.

Figure 17:
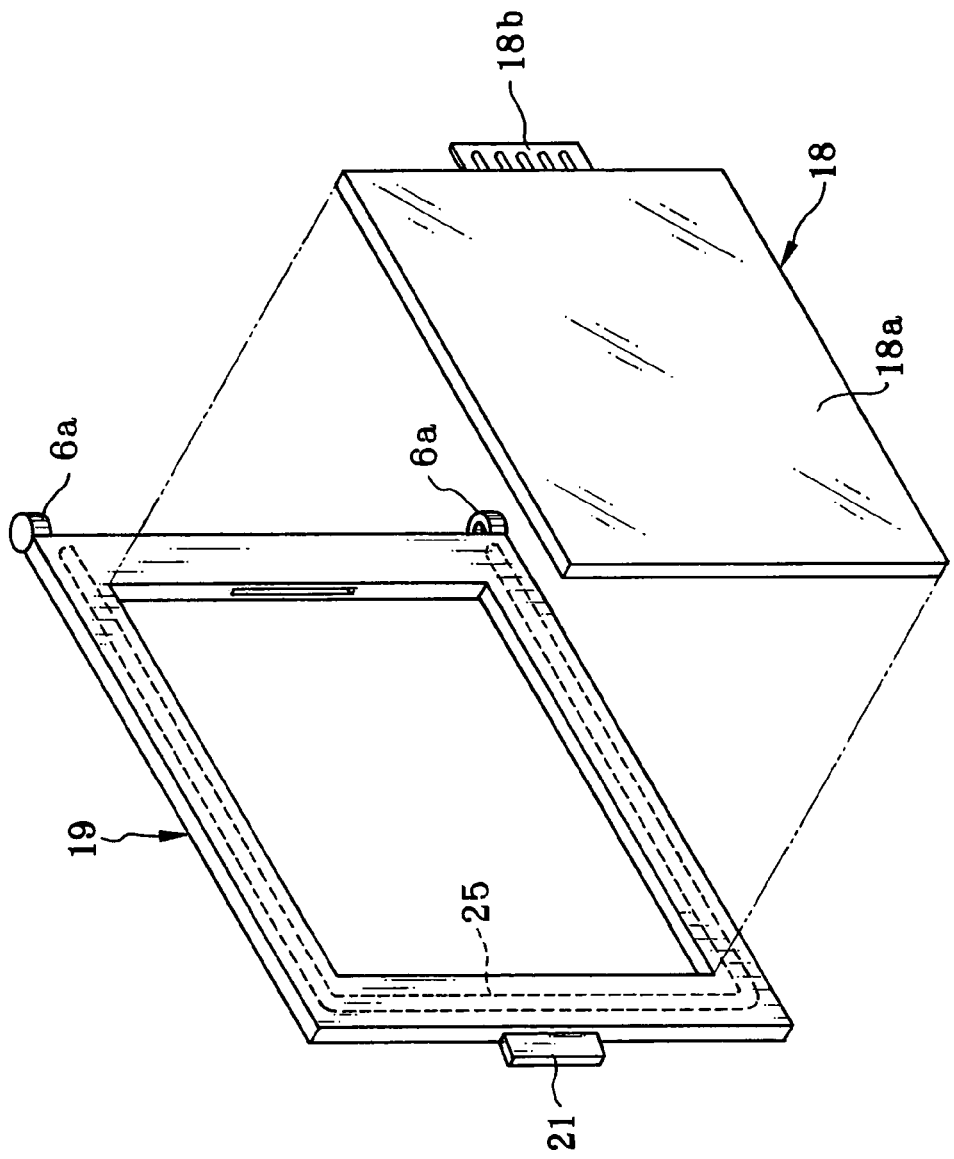
FIG. 17 is an exploded perspective illustrating another preferred display unit.
Figure 18:
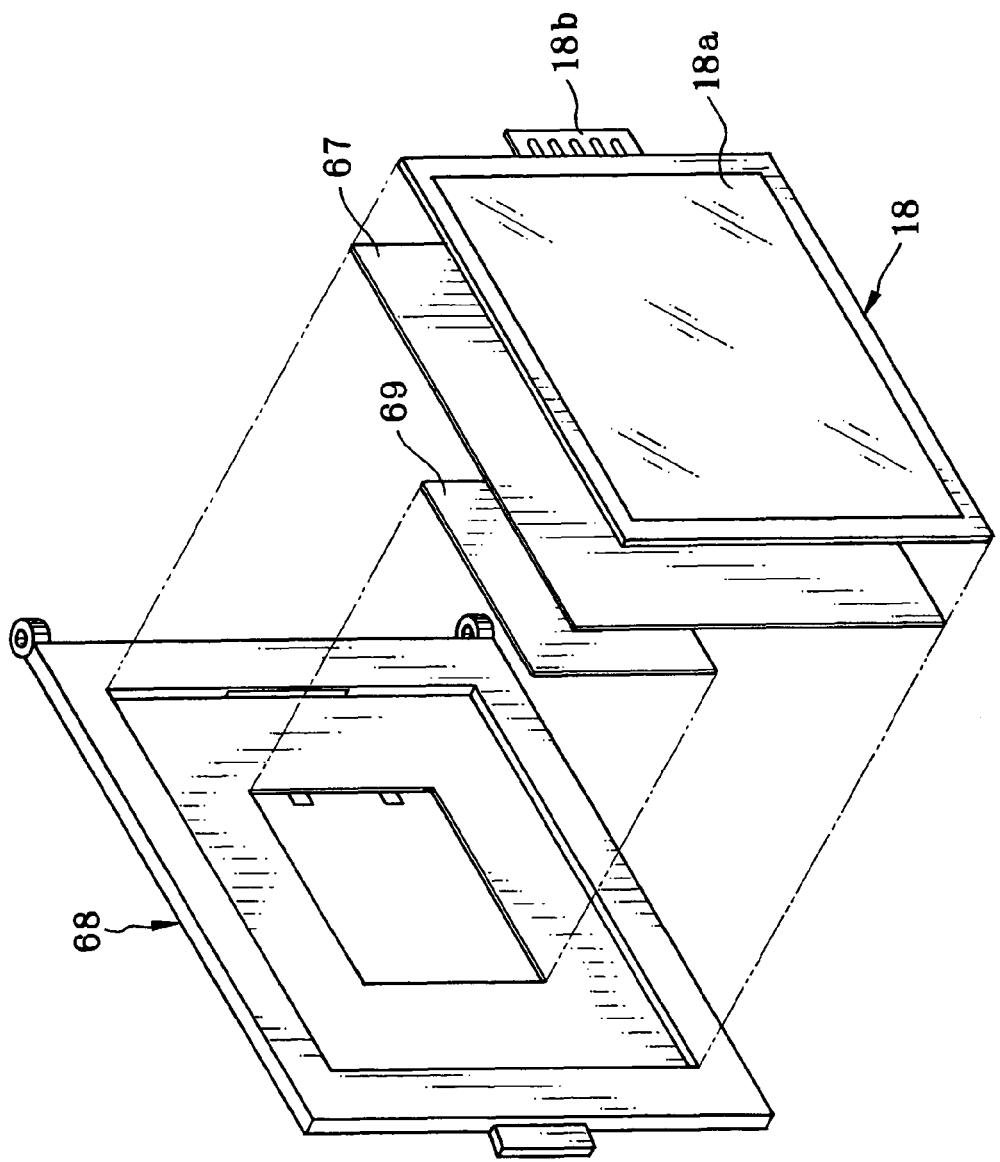
FIG. 18 is an exploded perspective illustrating one preferred display unit having a stainless flat panel and a bezel.
Figure 19:
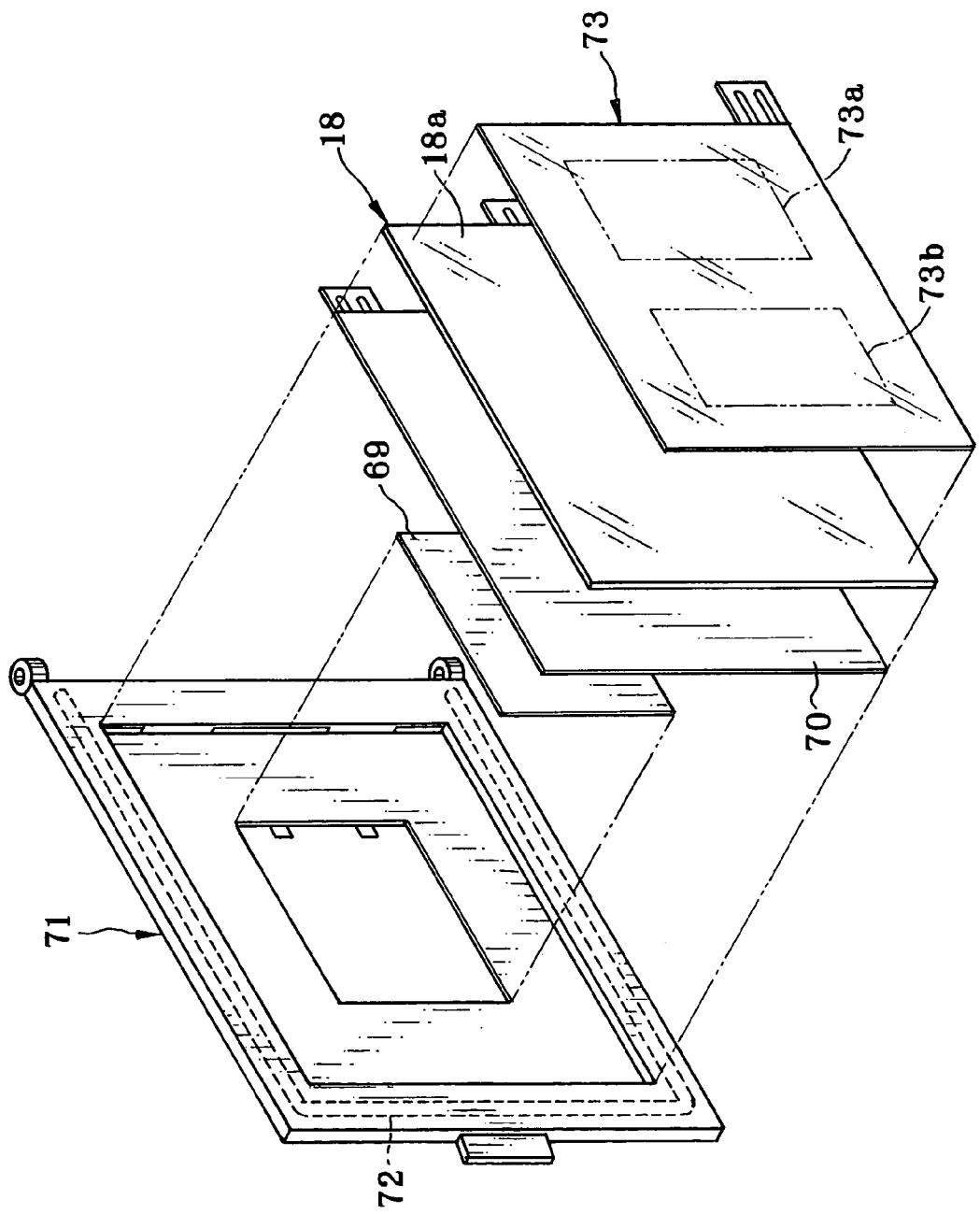
FIG. 19 is an exploded perspective illustrating another preferred display unit.

Further modifications of the display unit 5 are possible. In FIGS. 17-19, other examples of flexible display units are illustrated. In FIG. 17 is illustrated the display unit 5 without the protection film 22.

In FIG. 18, an example of the display unit 5 is illustrated, including a stainless flat panel 67 as resilient element and a bezel or frame-shaped support 68. The stainless flat panel 67 is disposed behind the organic ELD panel 18. The bezel 68 supports the organic ELD panel 18 and the stainless flat panel 67 overlapped thereon. The stainless flat panel 67 has such a characteristic that, when curved by applying external force, the stainless flat panel 67 tends to recover its original flat shape. For a panel, various examples other than stainless steel can be used, such as Ni—Ti alloy, polymer and other hyperelastic materials. The bezel 68 is formed from elastomer and is flexible.

Also, a sheet battery 69 as camera power source may be secured to the bezel 68. The sheet battery 69 is a secondary cell having a small thickness, and consists of polymer of electrolyte, and lithium alloy and carbon oxide between which the polymer of electrolyte is sandwiched. The sheet battery 69 is highly flexible, and can be deformed at a high degree of freedom. The battery 10 is unnecessary in the camera body 4 having the grip portion, as the sheet battery 69 is inside in the display unit 5. This is favorable because a hard disk drive or other devices may be added.

In FIG. 19, an example of the display unit 5 includes a bezel or frame-shaped support 71 and a flexible wiring board 70 behind the organic ELD panel 18. A shape memory alloy wire 72 as resilient element is incorporated in the bezel 71 for flattening the display unit 5. It is also preferable that a transparent thin-film stereo speaker 73 as sound source is attached to the display surface 18a of the organic ELD panel 18. The thin-film speaker 73 consists of macromolecular piezoelectric film and electrically conductive polymer, is highly flexible, and can be deformed at a high degree of freedom. An R channel speaker unit or sound source unit 73a generates sounds of an R channel. An L channel speaker unit or sound source unit 73b generates sounds of an L channel. The thin-film speaker 73 on the organic ELD panel 18 has sufficient transmittance for keeping an image on the display surface 18a visible with high clarity.

Furthermore, it is possible to use retaining structures other than the fastening clamp 20 or the retention claw 64. For example, caps (not shown) can be used to hold the digital still camera 2 with the display unit 5 bent thereabout. When the caps are removed from the digital still camera 2, the display unit 5 will be spread flatly by resiliency of the shape memory alloy or stainless plate.

In the above embodiments, the display unit 5 recovers its flat shape in response to discontinuing external force to keep the roll form. Alternatively, an element with plastically deformable property may be incorporated in the display unit 5 in place of the wire or stainless plate. Example of this is plastically deformable wire. This makes it possible to keep the display unit 5 fitted on the camera body without force or stress to the display unit 5 or without retaining mechanism of the above. For the purpose of using the display unit 5, a user can spread the display unit 5 manually, and keep the display unit 5 in a flat state owing to the plastically deformable property.

Note that it is further possible for the display unit 5 to have two display surfaces directed in directions opposite to one another, in contrast with the display surface 18a being single according to the above embodiment.

In the above embodiment, the organic ELD panel 18 is used. However, a display panel of the invention may be a film liquid crystal panel, inorganic ELD panel, or other flexible structures of a light valve of a visible type. Furthermore, it is preferable to use a backlight in combination with a film liquid crystal panel. An example of the backlight can be an organic ELD panel of a white color for use simply as a light source.

In the above embodiment, the USB port 24 is provided in the digital still camera 2. However, interfacial connection of the digital still camera 2 with external instruments may be according to a system other than USB, for example according to IEEE 1394 connection. Also, extra interfaces may be added besides the USB port 24, for example, an infrared communication interface. Furthermore, the external instruments connectable with the digital still camera 2 may be PDA, cellular telephone or the like other then a computer.

In the above embodiments, shapes of the imaging unit 3 and the camera body 4 having the grip portion are substantially a rectangular parallelepiped on with curved surfaces. However, the imaging unit 3 and the camera body 4 may have any shape as viewed in section, in a state coaxially supported on the rotational support mechanism 6 in a rotatable manner, and opposed to one another in the direction of the central axis P. A shape of a section of the camera body 4 is substantially equal to that of the imaging unit 3. Specifically, the imaging unit 3 and the camera body 4 can have a form of an ellipse according to the above embodiments. Such a suitable shape can be a combination of two semicircles and a quadrilateral, and other combinations of at least one arc and a polygon having one or more straight lines.

Note that the relative positions of the imaging unit 3 and the camera body 4 having the grip portion may be differently configured. For example, the imaging unit 3 may be located on the left side. The camera body 4 may be located to the right of the imaging unit 3. The central axis P of the rotational support mechanism 6 may extend horizontally on a lower side of the imaging unit 3. The display unit 5 may be spread widely in an upward direction. The camera body 4 can be unfolded downwards from an upper closed position that is on the object side of the display unit 5.

Alternatively, the imaging unit 3 may be located on the left side. The camera body 4 having the grip portion may be located to the right of the imaging unit 3. The central axis P of the rotational support mechanism 6 may extend horizontally on an upper side of the imaging unit 3. The display unit 5 may be spread widely in a downward direction. The camera body 4 can be unfolded upwards from a lower closed position that is on the object side of the display unit 5.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A digital camera comprising:
   an imaging unit, having an image pickup device including an objective lens;
   a camera body;
   a rotational supporting mechanism for keeping relatively rotatable said imaging unit and said camera body arranged vertically from one another, said camera body being rotated to be aligned with the imaging unit in a non-photography operation, and being rotated to be offset from the imaging unit in a photography operation;
   a flexible display unit having a display surface for displaying an image thereon, wherein said flexible display unit is secured to said rotational supporting mechanism, and wherein said flexible display unit comprises a flexible display panel wound around said imaging unit and said camera body when said camera body is aligned with said imaging unit;
   a shutter release button positioned on a first surface of the camera body, the first surface facing the imaging unit in the non-photography operation; and
   an operating member disposed on a second surface of the camera body, the second surface being different from the first surface,
   wherein said camera body is in a shape defined by extending a shape of said imaging unit in a direction along a central axis of said rotational supporting mechanism, and wherein the shutter release button is configured to be covered by said imaging unit in the non-photography operation, and be offset from said imaging unit to be exposed in the photography operation,
   wherein the objective lens and the operating member are directed to the same direction in the non-photography operation and directed to different directions in the photography operation, and
   wherein lateral portions of said imaging unit and said camera body are connected to said rotational supporting mechanism, and the axis of the rotational movement of said imaging unit and said camera body exists in said rotational supporting mechanism.

2. A digital camera including an image pickup device including an objective lens, the digital camera comprising:
   a camera body, having an image processing circuit;
   an imaging unit having said image pickup device incorporated therein;
   a rotational support mechanism for keeping said camera body relatively rotatable on said imaging unit between a closed position and an open position, said imaging unit and said camera body being arranged vertically from one another, said camera body being aligned with said imaging unit when in said close position, said camera body being rotationally displaced from said imaging unit when said camera body is in said open position;
   a flexible display unit having a display surface for displaying an image thereon, wherein said flexible display unit is secured to said rotational supporting mechanism, said display unit being deformable between a state where said display unit is spread and a state where said display unit is wound around said main body;
   a shutter release button positioned on a first surface of the camera body, the first surface facing the imaging unit in the closed position; and
   an operating member disposed on a second surface of the camera body, the second surface being different from the first surface,
   wherein a shutter release button is configured to be covered by said imaging unit in the closed position, and be offset from said imaging unit to be exposed in the open position,
   wherein the objective lens and the operating member are directed to the same direction in the closed position and directed to different directions in the open position, and
   wherein lateral portions of said imaging unit and said camera body are connected to said rotational supporting mechanism, and the axis of the rotational movement of said imaging unit and said camera body exists in said rotational supporting mechanism.

3. A digital camera as defined in claim 1 or 2, wherein said camera body includes a circuit board for controlling said imaging unit and said flexible display unit and for processing said image being picked up.

4. A digital camera as defined in claim 1 or 2, wherein said imaging unit further includes an electronic flash device for emitting flash light to a field to be photographed.

5. A digital camera as defined in claim 4, further comprising a signal line, disposed along said rotational supporting mechanism to extend between said camera body and said imaging unit, for electrically connecting said image pickup device and said flash device to a circuit board.

6. A digital camera as defined in claim 4, wherein said imaging unit includes a photographing optical system for focusing object light on said image pickup device;

wherein said photographing optical system includes a deflecting element for deflecting said object light having entered on a first path from an object side, to introduce said object light on a second path toward said image pickup device, and said second path extends along and behind said flash device.

7. A digital camera as defined in claim 1 or 2, wherein said flexible display unit comprises a flexible display panel settable about said imaging unit and said camera body when said camera body is aligned with said imaging unit.

8. A digital camera as defined in claim 7, wherein said flexible display unit includes:
   a frame-shaped support, having an opening;
   said display panel being fitted in said opening;
   a protection film, fitted on one surface of said frame-shaped support, for protecting said display panel;
   a first connecting portion for protruding from an upper end of said frame-shaped support, and for connection with said rotational supporting mechanism at an upper surface of said imaging unit; and
   a second connecting portion for protruding from a lower end of said frame-shaped support, and for connection with said rotational supporting mechanism at a lower surface of said camera body.

9. A digital camera as defined in claim 1 or 2, wherein said flexible display unit is set about said imaging unit and said camera body with said display surface directed inside.

10. A digital camera as defined in claim 9, further comprising a retention mechanism for retaining said flexible display unit set about said camera body.

11. A digital camera as defined in claim 1 or 2, wherein said flexible display unit is set about said imaging unit and said camera body with said display surface directed outside.

12. A digital camera as defined in claim 11, further comprising a retention mechanism for retaining said flexible display unit set about said camera body.

13. A digital camera as defined in claim 11, further comprising a standby image switch for turning on while said flexible display unit is set about, to cause said flexible display unit to display a standby image in a standby mode.

14. A digital camera as defined in claim 13, further comprising a rotation detector for detecting a relative rotational position of said imaging unit, wherein a circuit board changes over an operating condition according to a detection signal of said rotation detector.

15. A digital camera as defined in claim 14, wherein said rotation detector is positioned between said imaging unit and said camera body, or between said camera body and said flexible display unit.

16. A digital camera as defined in claim 15, further comprising an auxiliary rotation detector for detecting a relative rotation of said imaging unit relative to said flexible display unit.

17. A digital camera as defined in claim 1 or 2, further comprising:
   a first switch, responsive to setting about of said flexible display unit with said display surface directed inside, for turning off a camera power source;
   a second switch, responsive to setting about of said flexible display unit with said display surface directed outside, for causing said flexible display unit to display an image.

18. A digital camera as defined in claim 1 or 2, further comprising:
   a retention projection formed to project from said camera body and close to said rotational supporting mechanism; and
   a retention slot, formed in a free edge of said flexible display unit positioned opposite to said rotational supporting mechanism, for retaining said retention projection when said flexible display unit is set about said camera body.

19. A digital camera as defined in claim 1 or 2, further comprising a depressible power pushbutton, disposed on said camera body and close to said rotational supporting mechanism, for being depressed by said flexible display unit when said flexible display unit is bent on and about said camera body, to turn off a camera power source, and for being released from pressure when said flexible display unit is spread from said camera body, to turn on said camera power source.

20. A digital camera as defined in claim 1 or 2, wherein said imaging unit is fixedly connected with said flexible display unit.

21. A digital camera as defined in claim 1 or 2, wherein said flexible display unit includes:
   a flexible display panel for displaying an image when spread open; and
   a resilient element, secured to said display panel in an overlaid manner, for keeping said display panel spread upon partial disengagement of said display panel from said camera body.

22. A digital camera as defined in claim 21, wherein said flexible display unit includes a sheet battery, secured to said display panel in an overlaid manner, for supplying said display panel with power.

23. A digital camera as defined in claim 21, wherein said flexible display unit includes a transparent thin-film sound source, secured to said display surface on said display panel, for generating sound.

24. A digital camera as defined in claim 1 or 2, wherein said flexible display unit comprises any one of an organic electroluminescence element, inorganic electroluminescence element, and flexible film liquid crystal.

25. A digital camera as defined in claim 1 or 2, further comprising an interface for transmitting image data obtained by image pickup to an external electronic device.

26. A digital camera as defined in claim 25, wherein communication with said interface is according to at least one of USB, IEEE 1394, infrared communication, and wireless communication.

27. A digital camera as defined in claim 2, wherein the shutter release button is provided on said camera body in a position on an end face thereof and confronted with said imaging unit, for being covered by said imaging unit when said camera body is in said closed position, and for offsetting from said imaging unit when said camera body is in said open position.

28. A digital camera as defined in claim 1 or 2, wherein said imaging unit has a contour flush with a contour of said camera body.

29. An apparatus comprising:
   a first main body having an image pickup device including an objective lens;
   a second main body including a shutter release button and an operating member;
   a rotational supporting mechanism for keeping relatively rotatable the first and second main bodies arranged vertically from one another, the second main body being rotated to be aligned with the first main body in a non-photography operation, and being rotated to be offset from the first main body in a photography operation; and
   a flexible display unit, having a display surface for displaying an image thereon, said display unit having three states where said display unit is spread, said display unit is wound around said main body with said display surface outside and said display unit is wound around said main body with said display surface inside, wherein the shutter release button is positioned on a first surface of the second main body, the first surface facing the first main body in the non-photography operation, and the operating member is disposed on a second surface of the second main body, the second surface being different from the first surface, wherein the shutter release button is configured to be covered by the first main body in the non-photography operation, and be offset from the first main body to be exposed in the photography operation, wherein the objective lens and the operating member are directed to the same direction in the non-photography operation and directed to different directions in the photography operation, and wherein lateral portions of said first and second main bodies are connected to said rotational supporting mechanism, and the axis of the rotational movement of said first and second main bodies exists in said rotational supporting mechanism.

30. An apparatus as defined in claim 29, wherein said second main body includes a circuit board for controlling said first main body and said flexible display unit and for processing said image being picked up.

31. An apparatus as defined in claim 29, wherein said first main body further includes an electronic flash device for emitting flash light to a field to be photographed.

32. An apparatus as defined in claim 29, further comprising a signal line, disposed along said rotational supporting mechanism to extend between said first and second main bodies, for electrically connecting said image pickup device and said flash device to a circuit board.

33. An apparatus as defined in claim 29, wherein said first main body includes a photographing optical system for focusing object light on said image pickup device;

wherein said photographing optical system includes a deflecting element for deflecting said object light having entered on a first path from an object side, to introduce said object light on a second path toward said image pickup device, and said second path extends along and behind said flash device.

34. An apparatus as defined in claim 29, wherein said flexible display unit comprises a flexible display panel settable about said first and second main bodies when said second main body is aligned with said first main body.

35. An apparatus as defined in claim 34, wherein said flexible display unit includes:
a frame-shaped support, having an opening;
said display panel being fitted in said opening;
a protection film, fitted on one surface of said frame-shaped support, for protecting said display panel;
a first connecting portion for protruding from an upper end of said frame-shaped support, and for connection with said rotational supporting mechanism at an upper surface of said first main body; and
a second connecting portion for protruding from a lower end of said frame-shaped support, and for connection with said rotational supporting mechanism at a lower surface of said second main body.

36. An apparatus as defined in claim 29, wherein said flexible display unit is set about said first and second main bodies with said display surface directed inside.

37. An apparatus as defined in claim 26, further comprising a retention mechanism for retaining said flexible display unit set about said second main body.

38. An apparatus as defined in claim 29, wherein said flexible display unit is set about said first and second main bodies with said display surface directed outside.

39. An apparatus as defined in claim 38, further comprising a retention mechanism for retaining said flexible display unit set about said second main body.

40. An apparatus as defined in claim 38, further comprising a standby image switch for turning on while said flexible display unit is set about, to cause said flexible display unit to display a standby image in a standby mode.

41. An apparatus as defined in claim 40, further comprising a rotation detector for detecting a relative rotational position of said first main body, wherein a circuit board changes over an operating condition according to a detection signal of said rotation detector.

42. An apparatus as defined in claim 41, wherein said rotation detector is positioned between said first and second main bodies, or between said second main body and said flexible display unit.

43. An apparatus as defined in claim 42, further comprising an auxiliary rotation detector for detecting a relative rotation of said first main body to said flexible display unit.

44. An apparatus as defined in claim 29, further comprising:
a first switch, responsive to setting about of said flexible display unit with said display surface directed inside, for turning off an apparatus power source;
a second switch, responsive to setting about of said flexible display unit with said display surface directed outside, for causing said flexible display unit to display an image.

45. An apparatus as defined in claim 29, further comprising:
a retention projection formed to project from said second main body and close to said rotational supporting mechanism; and
a retention slot, formed in a free edge of said flexible display unit positioned opposite to said rotational supporting mechanism, for retaining said retention projection when said flexible display unit is set about said second main body.

46. An apparatus as defined in claim 29, further comprising a depressible power pushbutton, disposed on said second main body and close to said rotational supporting mechanism, for being depressed by said flexible display unit when said flexible display unit is bent on and about said second main body, to turn off an apparatus power source, and for being released from pressure when said flexible display unit is spread from said second main body, to turn on said apparatus power source.

47. An apparatus as defined in claim 29, wherein said first main body is fixedly connected with said flexible display unit.

48. An apparatus as defined in claim 29, wherein said flexible display unit includes:
a flexible display panel for displaying an image when spread open; and
a resilient element, secured to said display panel in an overlaid manner, for keeping said display panel spread upon partial disengagement of said display panel from said second main body.

49. An apparatus as defined in claim 48, wherein said flexible display unit includes a sheet battery, secured to said display panel in an overlaid manner, for supplying said display panel with power.

50. An apparatus as defined in claim 48, wherein said flexible display unit includes a transparent thin-film sound source, secured to said display surface on said display panel, for generating sound.

51. An apparatus as defined in claim 29, wherein said flexible display unit comprises any one of an organic electroluminescence element, inorganic electroluminescence element, and flexible film liquid crystal.

52. An apparatus as defined in claim 29, further comprising an interface for transmitting image data obtained by image pickup to an external electronic device.

53. An apparatus as defined in claim 52, wherein communication with said interface is according to at least one of USB, IEEE 1394, infrared communication, and wireless communication.

54. An apparatus as defined in claim 29, wherein said first main body has a contour flush with a contour of said second main body.

* * * * *